United States Patent
Okawa et al.

(10) Patent No.: US 8,824,063 B2
(45) Date of Patent: Sep. 2, 2014

(54) OPTICAL DEVICE

(75) Inventors: Satoshi Okawa, Hachioji (JP); Atsushi Takahashi, Hino (JP); Yutaka Arakawa, Akishima (JP)

(73) Assignee: Olympus Imaging Corp., Tokyo (JP)

(*) Notice: Subject to any disclaimer, the term of this patent is extended or adjusted under 35 U.S.C. 154(b) by 27 days.

(21) Appl. No.: 13/571,556

(22) Filed: Aug. 10, 2012

(65) Prior Publication Data

US 2013/0148212 A1  Jun. 13, 2013

(30) Foreign Application Priority Data

Aug. 11, 2011  (JP) .................................. 2011-176266

(51) Int. Cl.
*G02B 15/16* (2006.01)

(52) U.S. Cl.
USPC .......................................... 359/691; 359/694

(58) Field of Classification Search
USPC ......... 359/691, 693, 697, 702, 703, 705, 706, 359/798–801, 812, 816, 817, 828; 396/81, 396/83
See application file for complete search history.

(56) References Cited

U.S. PATENT DOCUMENTS

| | | | | |
|---|---|---|---|---|
| 5,638,217 A | * | 6/1997 | Hirasawa et al. | 359/698 |
| 2003/0035224 A1 | * | 2/2003 | Nishimura et al. | 359/699 |
| 2007/0212048 A1 | * | 9/2007 | Morimoto | 396/85 |
| 2009/0268310 A1 | * | 10/2009 | Honjo et al. | 359/698 |
| 2010/0310245 A1 | * | 12/2010 | Honjo et al. | 396/85 |
| 2011/0200316 A1 | * | 8/2011 | Sugiura | 396/131 |

FOREIGN PATENT DOCUMENTS

JP  2006-65033  3/2006

* cited by examiner

*Primary Examiner* — Scott J Sugarman
*Assistant Examiner* — William Alexander
(74) *Attorney, Agent, or Firm* — John C. Pokotylo; Straub & Pokotylo

(57) ABSTRACT

An optical device includes a first and second lens group, an operation member, a first and second lens group position detection unit, a storage unit, a control unit. The control unit controls the movement of the second lens group based on positional information of the first lens group detected by the first lens group position detection unit and the positional relationship information stored in the storage unit, and determines whether a control state of the second lens group is abnormal based on control positional information during the control of the movement of the second lens group and the signal corresponding to the position of the second lens group detected by the second lens group position detection unit.

17 Claims, 21 Drawing Sheets

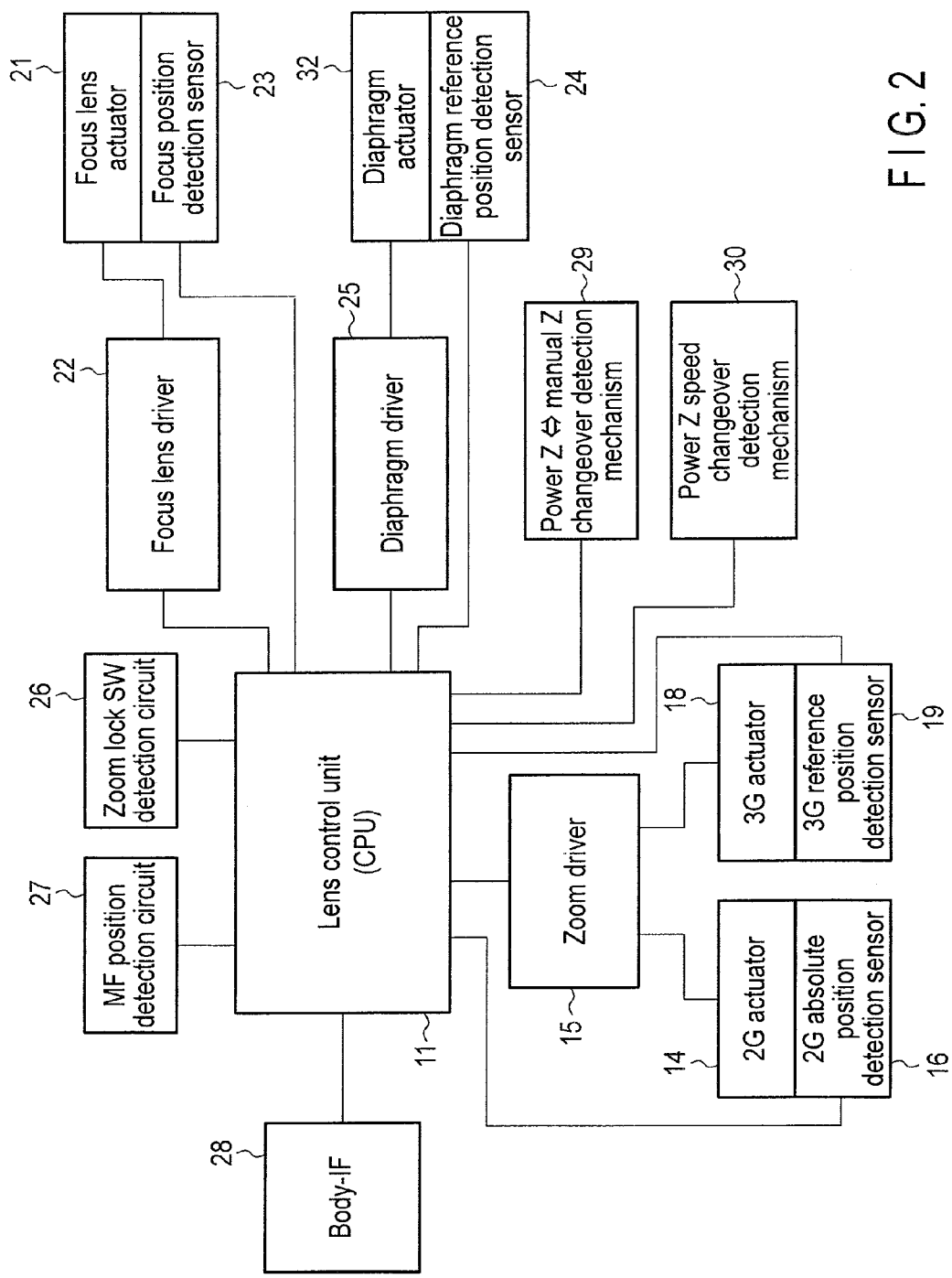
F I G. 2

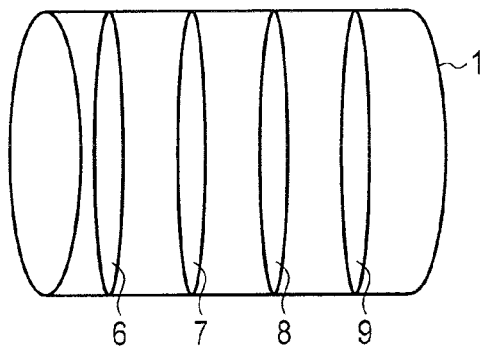
F I G. 3
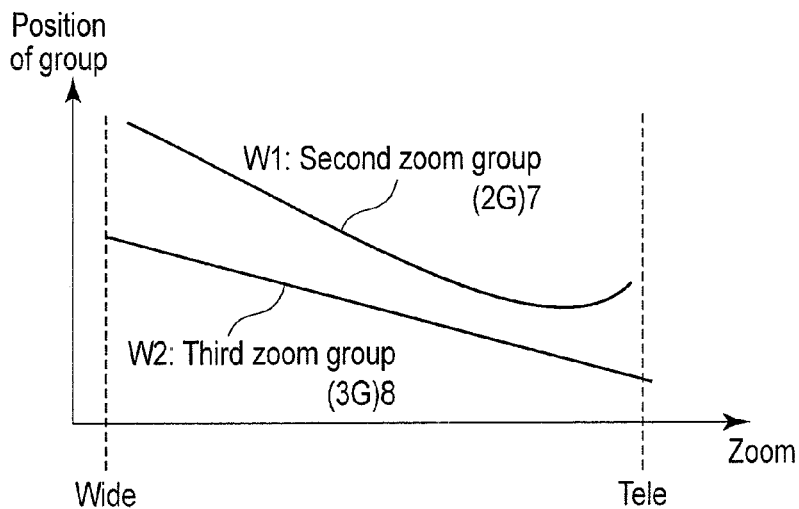
F I G. 4
| Zoom position | Second group | Third group |
|---|---|---|
| x/1000 division | Pls(Pulse) | Pls(Pulse) |
| Wide | 700 | 2000 |
| • | 600 | 1700 |
| • | 500 | 1400 |
| Std | 400 | 1100 |
| • | 300 | 800 |
| • | 200 | 1000 |
| Tele | 100 | 1100 |
F I G. 5

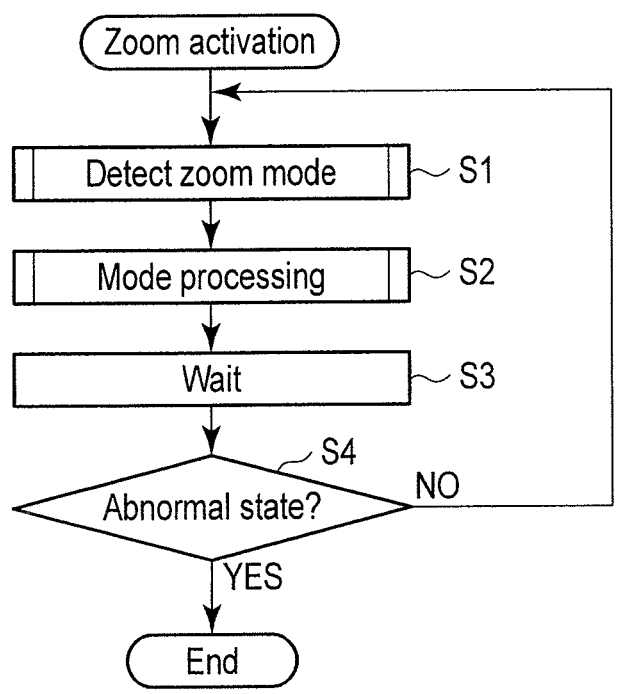
F I G. 15

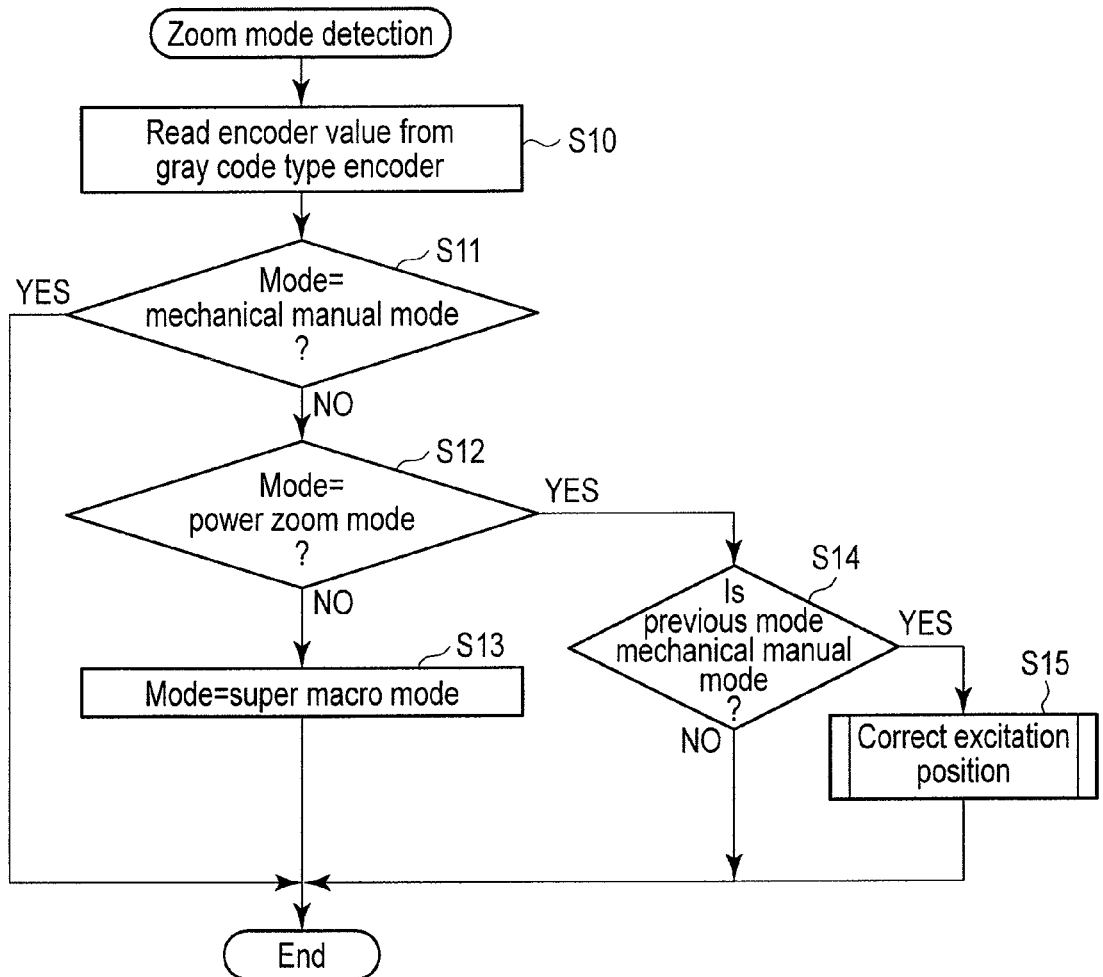
F I G. 16

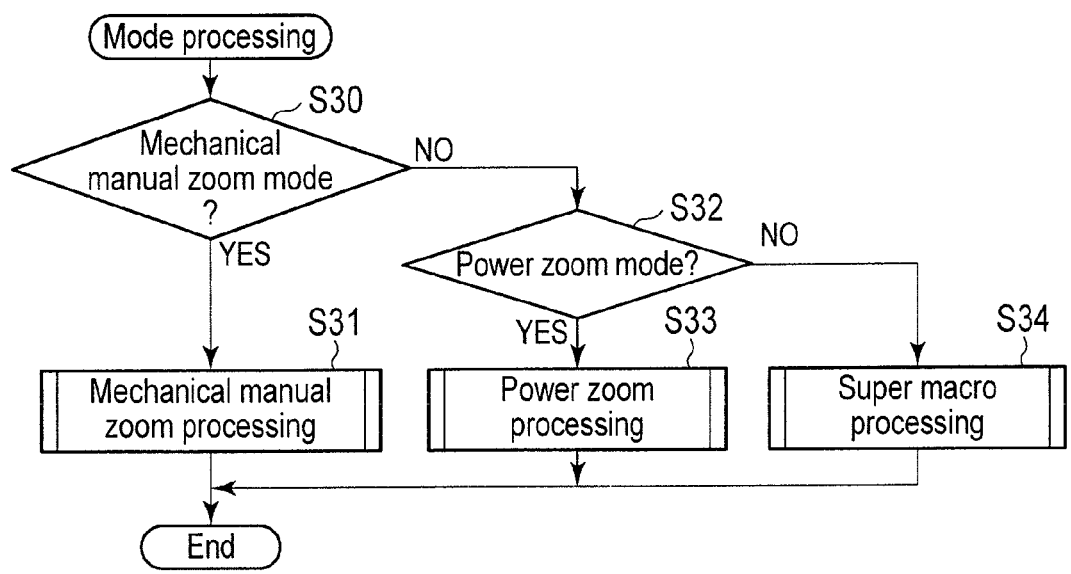
F I G. 19

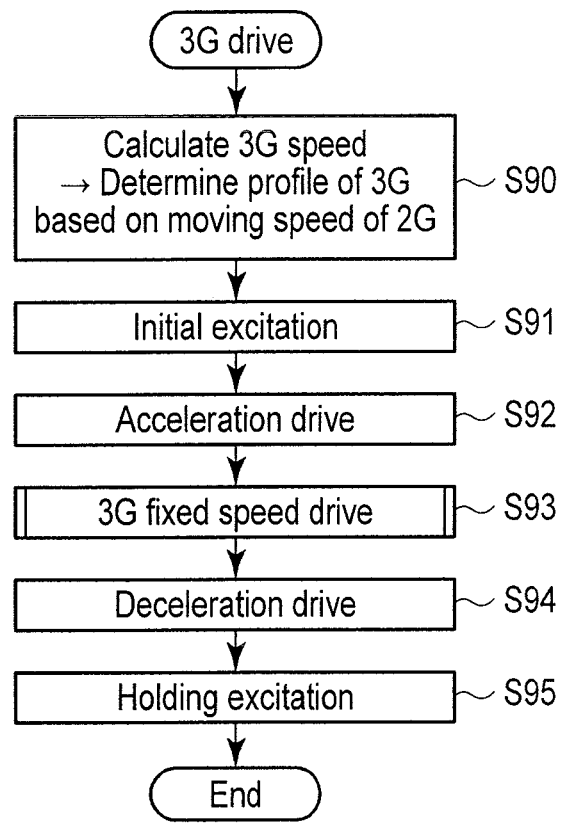
F I G. 25

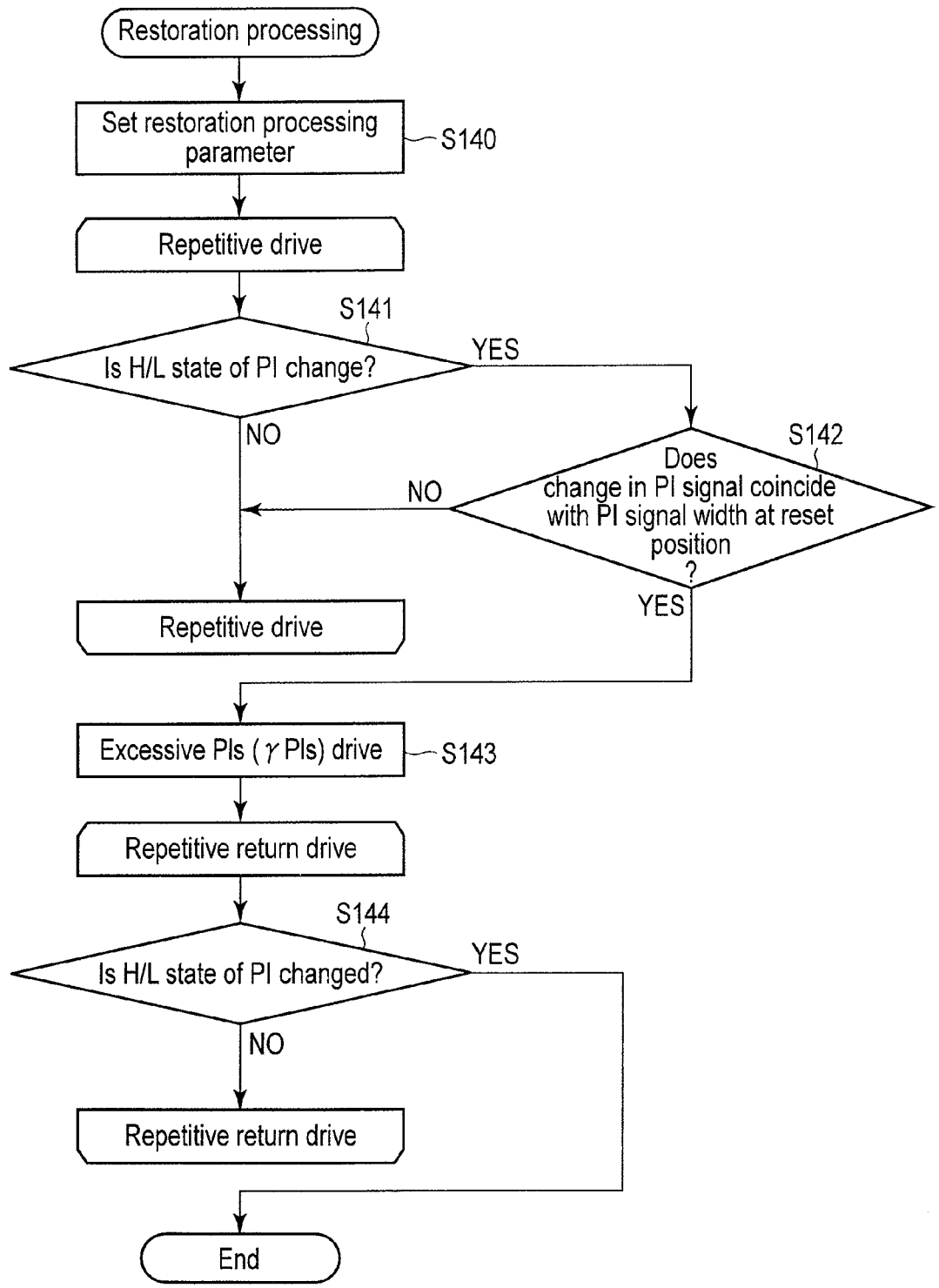
F I G. 29

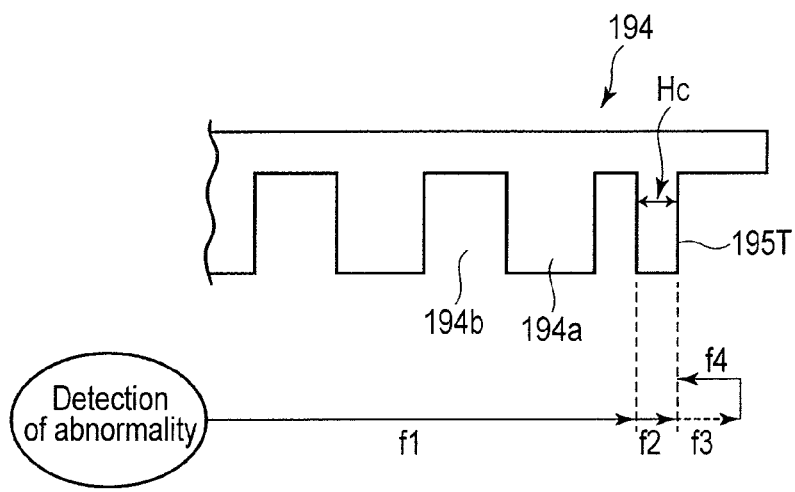
F I G. 30
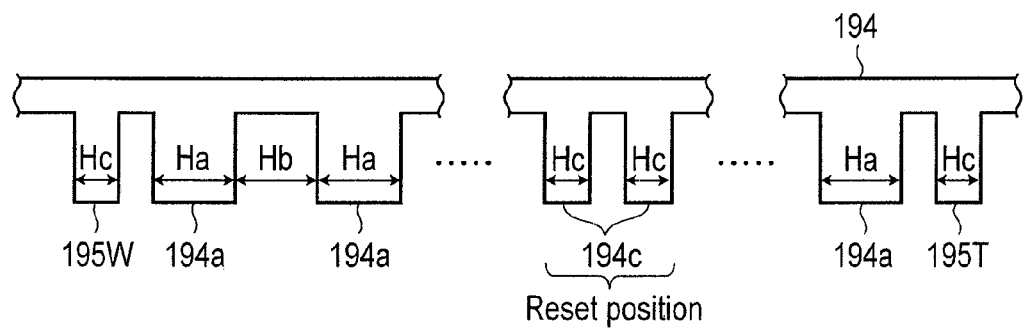
F I G. 31
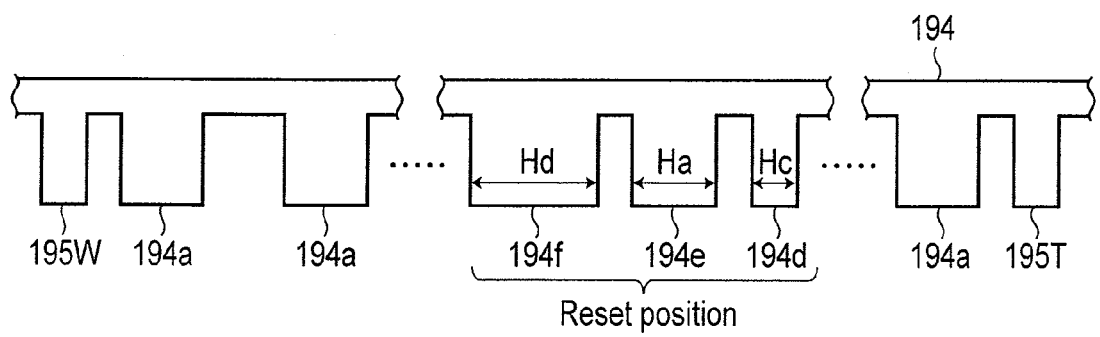
F I G. 32

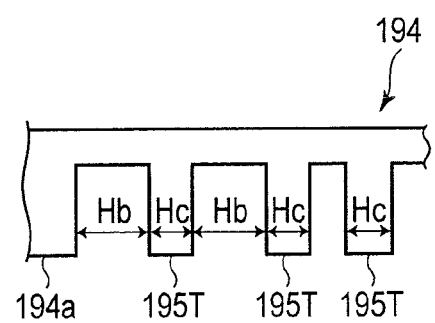
F I G. 33
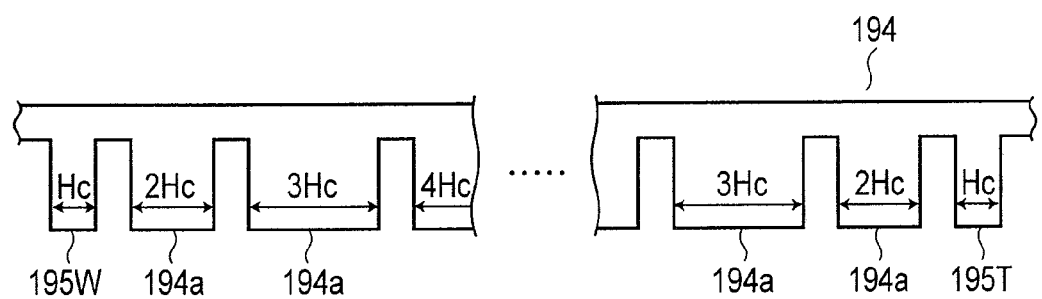
F I G. 34

OPTICAL DEVICE

CROSS-REFERENCE TO RELATED APPLICATIONS

This application is based upon and claims the benefit of priority from prior Japanese Patent Application No. 2011-176266, filed Aug. 11, 2011, the entire contents of which are incorporated herein by reference.

BACKGROUND OF THE INVENTION

1. Field of the Invention

The present invention relates to an optical device having a zoom function that changes a focal length of a shooting optical system.

2. Description of the Related Art

As a zoom lens apparatus, there is known one that moves a zoom lens by a stepping motor. As a technology of the zoom lens apparatus, for example, there is Jpn. Pat. Appln KOKAI Publication No. 2006-65033. Jpn. Pat. Appln KOKAI Publication No. 2006-65033 discloses that a position of a zoom lens is detected by an analog position detection element and step-out of a stepping motor is detected during a moving operation of the zoom lens.

BRIEF SUMMARY OF THE INVENTION

An optical device according to aspect of the present invention comprises at least first and second lens groups which move in a direction of an optical axis to perform an optical zoom operation, an operation member which instructs the optical zoom operation, a first lens group position detection unit which detects a position of the first lens group that moves in accordance with an operation of the operation member, a second lens group position detection unit which outputs a signal corresponding to a position of the second lens group, a storage unit which stores positional relationship information indicating a positional relationship between the first lens group and the second lens group associated with a focal length at the zoom operation, and a control unit which controls the movement of the second lens group based on positional information of the first lens group detected by the first lens group position detection unit and the positional relationship information stored in the storage unit, wherein the control unit determines whether a control state of the second lens group is abnormal based on control positional information during the control of the movement of the second lens group and the signal corresponding to the portion of the second lens group detected by the second lens group position detection unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing an electrical system of the optical device;

FIG. 3 is a structural view showing a lens system in the optical device;

FIG. 4 is a view showing a positional relationship of a space from a Wide side to a Tele side between second and third zoom groups in the optical device;

FIG. 5 is a view showing zoom positions of the second zoom group (2G) and the third zoom group (3G) in the optical device by using the numbers of pulses;

FIG. 15 is a zoom starting flowchart in the optical device;

FIG. 16 is a zoom mode detection flowchart in the optical device;

FIG. 19 is a zoom mode processing flowchart in the optical device;

FIG. 25 is a third zoom group drive flowchart in the optical device;

FIG. 29 is a restoration processing flowchart in the optical device;

FIG. 30 is a view showing a return operation of the third zoom group based on the restoration processing in the optical device;

FIG. 31 is a structural view showing another modification of the comb tooth member in the optical device;

FIG. 32 is a structural view showing still another modification of the comb tooth member in the optical device;

FIG. 33 is a structural view showing yet another modification of the comb tooth member in the optical device; and FIG. 34 is a structural view showing a further modification of the comb tooth member in the optical device.

DETAILED DESCRIPTION OF THE INVENTION

Hereinafter, embodiments of the present invention will be described with reference to the drawings.

Figure 1:
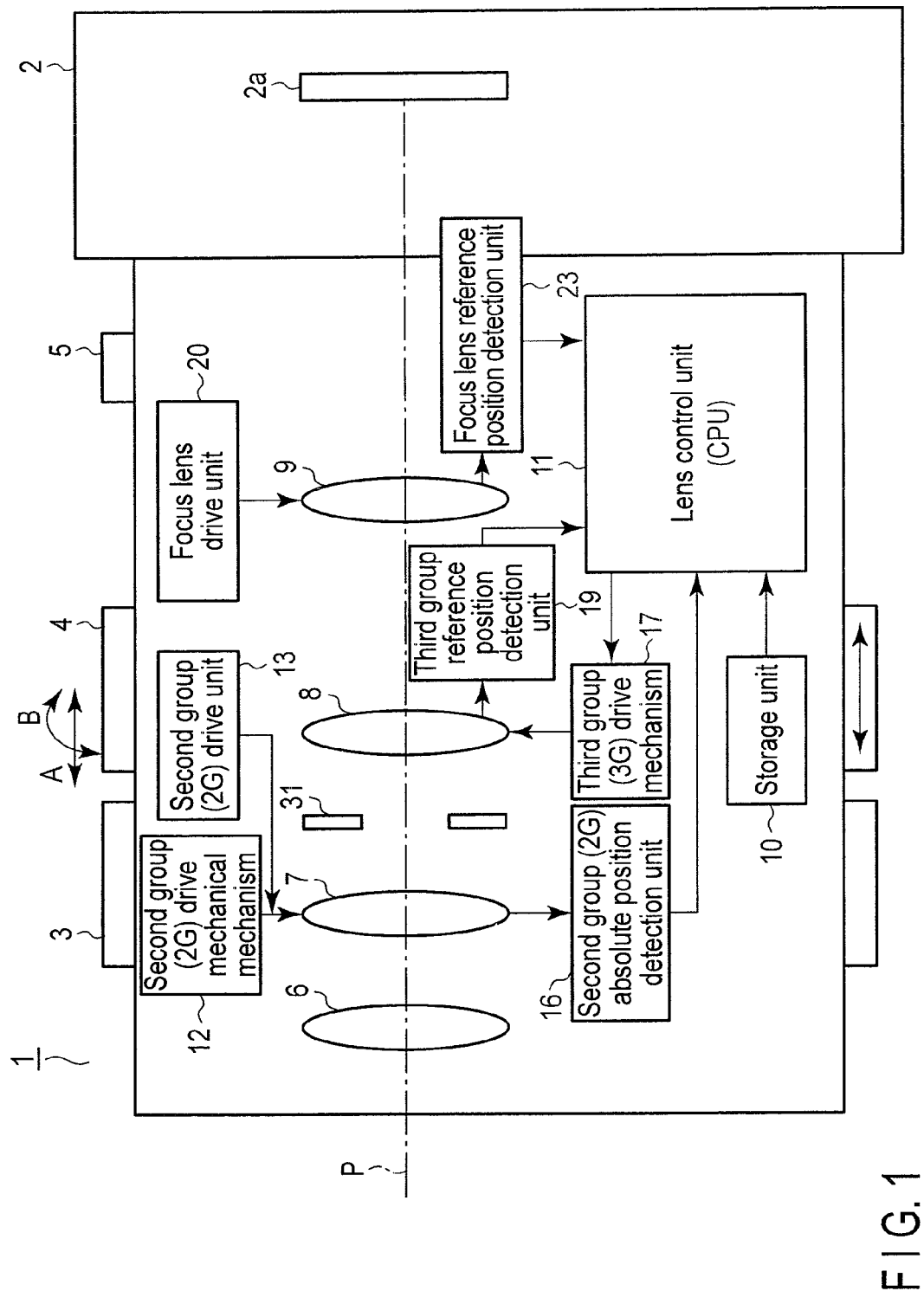
FIG. 1 is a block diagram showing an embodiment of an optical device according to the present invention.

FIG. 1 shows a block diagram of an interchangeable lens as an optical device. FIG. 2 is a block diagram of an electrical system. The interchangeable lens 1 is attachable to/detachable from a camera main body 2. An imaging element 2a is provided to the camera main body 2.

A manual focus (MF) ring 3, a ring-like zoom function switching operation member 4, and a zoom lock switch (a zoom lock SW) 5 are provided to an external package of the interchangeable lens 1. The zoom function switching operation member 4 can move in the same direction (a direction of an arrow A) as an optical axis P and rotate in a circumferential direction (a direction of an arrow B) of the interchangeable lens 1.

In the interchangeable lens 1 are provided a first zoom group 6, a second zoom group (2G: a first lens group) 7, a third zoom group (3G: a second lens group) 8, and a fourth zoom group.

FIG. 3 shows a structural view of a lens system in the interchangeable lens 1. In first to fourth zoom groups 6 to 9, a second zoom group (2G) 7 and a third zoom group (3G) 8 can be driven. The fourth zoom group 9 is a focus lens group (which will be referred to as a focus lens group 9 hereinafter).

FIG. 4 shows a positional relationship between the second zoom group (2G) 7 and the third zoom group (3G) 8 in a space from a wide-angle (Wide) side to a telescopic (Tele) side. In this drawing, an abscissa represents a zoom position and an ordinate represents a position of the zoom group.

FIG. 5 shows each zoom position of the second zoom group (2G) 7 and the third zoom group (3G) 8 in FIG. 4 by the number of pulses. Each zoom position of the second zoom group (2G) 7 and the third zoom group (3G) 8 is associated with control position information supplied from a lens control unit 11, which is specifically a pulse number (a drive pulse number) for driving each of the second zoom group (2G) 7 and the third zoom group (3G) 8.

The second zoom group (2G) 7 moves along a movement locus W1. The third zoom group (3G) 8 moves in accordance with a movement locus W2 to follow movement of the second zoom group (2G) 7. The second zoom group (2G) 7 and the third zoom group (3G) 8 move in such a manner that such a positional relationship between the respective movement loci W1 and W2 as shown in FIG. 4 can be maintained.

When the second zoom group (2G) 7 and the third zoom group (3G) 8 move to maintain such a positional relationship as shown in FIG. 4, a focusing state of the interchangeable lens 1 with respect to a subject is maintained, and the interchangeable lens 1 enters a state that a predetermined zoom position is zoomed. In FIG. 4, for ease of explanation, a locus of the third zoom group (3G) 8 is a straight line. Both the second zoom group (2G) 7 and the third zoom group (3G) 8 may draw nonlinear loci because of characteristics of the interchangeable lens 1.

The positional relationship information of the second zoom group (2G) 7 and the third zoom group (3G) 8 is stored in a storage unit 10. The storage unit 10 stores the positional relationship information of the second zoom group (2G) 7 and the third zoom group (3G) 8 associated with a focal length in a zoom operation. The storage unit 10 previously stores initializing positions which are used for initializing a position of the third zoom group (3G) 8 and a control positional information of the third zoom group (3G) 8.

In the second zoom group (2G) 7 are provided a second zoom group drive mechanical mechanism (which will be referred to as a second group drive mechanical mechanism hereinafter) 12 and a second group drive unit 13. The second group drive mechanical mechanism 12 moves the second zoom group (2G) 7 in the direction of the optical axis P. The second group drive unit 13 drives the second group drive mechanical mechanism 12. As shown in FIG. 2, the second group drive mechanical mechanism 12 is constituted of a 2G zoom actuator 14 and a zoom lens driver circuit 15. The 2G zoom actuator 14 uses, e.g., a stepping motor and performs highly accurate positional control in micro step drive. The second zoom group (2G) 7 is switched to one of three modes, e.g., a super micro mode, a power zoom mode, and a mechanical manual zoom mode by a switching operation performed by the zoom function switching operation member 4.

A second zoom group absolute position detection unit (which will be referred to as a second absolute position detection unit hereinafter) 16 as a first lens group position detection unit is provided to the second zoom group (2G) 7. The second group absolute position detection unit 16 detects an absolute position as positional information of the second zoom group (2G) 7. As the second group absolute position detection unit 16, for example, a linear encoder 16 is used.

A third zoom group drive mechanism (which will be referred to as a third group drive mechanism hereinafter) 17 is provided to the third zoom group (3G) 8. The third group drive mechanism 17 moves the third zoom group (3G) 8 in the direction of the optical axis P. The third group drive unit 17 operates the third zoom group (3G) 8 to follow a position associated with a movement position of the second zoom group (2G) 7. As shown in FIG. 2, the third group drive mechanism 17 is constituted of, e.g., a 3G zoom actuator 18 and a zoom lens driver circuit 15. For example, a stepping motor is used as the 3G zoom actuator 18, and it performs highly accurate positional control in the micro step drive. The zoom lens driver circuit 15 is shared by a driver of the second zoom group (2G) 7.

A third zoom group reference position detection unit (which will be referred to as a third group reference position detection unit hereinafter) 19 as a second lens group position detection unit is provided to the third zoom group (3G) 8. The third group reference position detection unit 19 acquires a reference position as positional information of the third zoom group (3G) 8 and manages a position in relative position detection. As the third group reference position detection unit 19, for example, a photo-interrupter (PI) is used.

A focus lens drive mechanism 20 is provided to the focus lens group 9. The focus lens drive mechanism 20 moves the focus lens group 9 in the direction of the optical axis P. As shown in FIG. 2, the focus lens driver mechanism 20 comprises a focus lens actuator 21 and a focus lens driver circuit 22. The focus lens drive circuit 22 drives the focus lens actuator 21. The focus lens actuator 21 moves the focus lens group 9 in the direction of the optical axis P.

A focus lens reference position detection unit (a focus lens position detection sensor) 23 is provided to the focus lens group 9. The focus lens reference position detection unit 23 detects a reference position of the focus lens group 9.

As shown in FIG. 2, the zoom lens driver circuit 15, the linear encoder 16, the third group reference position detection unit 19, and the focus lens driver circuit 22, and the focus lens position detection sensor 23 are connected to the lens control unit 11. To the lens control unit 11 are connected the storage unit 10, a diaphragm reference position detection sensor 24, a diaphragm driver circuit 25, a zoom lock SW detection circuit 26, an MF position detection circuit 27, a camera main body interface (Body-IF) 28, a power zoom/manual zoom changeover detection mechanism 29, and a power zoom speed changeover detection mechanism 30.

A diaphragm 31 is provided on the optical axis P of the second zoom group (2G) 7 and the third zoom group (3G) 8. The diaphragm 31 is driven by the diaphragm actuator 32 as a diaphragm drive mechanism. The diaphragm actuator 32 is driven by the diaphragm driver circuit 25. For example, a stepping motor is used for the diaphragm actuator 32, and micro step drive is performed to effect highly accurate control.

The diaphragm reference position detection sensor 24 detects a reference position of the diaphragm 31. The diaphragm reference position detection sensor 24 uses, e.g., a photo-interrupter (PI) for detection of a reference position. When the reference position of the diaphragm 31 is detected, a relative position of the diaphragm position of the diaphragm 31 can be managed.

The zoom function switching operating member 4 switches respective modes, i.e., a super macro mode, a power zoom mode, and a mechanical-manual zoom mode (which will be referred to as mechanism manual hereinafter), and electrically detects a switching position associated with switching of the respective mode. The switching operation of the zoom function switching operation unit 4 is performed based on an operation for shifting and moving the zoom switching operation unit to a subject side and the camera main body 2 side in the direction of the arrow A shown in FIG. 1.

The zoom function switching operation member 4 can freely rotate in a circumferential direction (a direction of an arrow B) in the mechanical manual mode. When the zoom function switching operation member 4 rotates in the direction of the arrow B in the mechanical manual mode, the second zoom group (2G) 7 moves in the direction of the optical axis P in accordance with an amount of rotational movement of the zoom function switching operation member 4 without electrical control. At this moment, the linear encoder 16 detects a position of the second zoom group (2G) 7 based on absolute position detection.

The lens control unit 11 is constituted of a CPU, an ROM, an RAM, and others. The lens control unit 11 makes reference to positional relationship information of the second zoom group (2G) 7 and the third zoom group (3G) 8 stored in the storage unit 10, and controls the third zoom group (3G) 8 to follow a position associated with a movement position of the second zoom group (2G) 7.

In the power zoom mode, the zoom function switching operation member 4 can rotate only in the rotation range in the circumferential direction (the direction of the arrow B) of the interchangeable lens 1 which is a mechanical mechanism. When the zoom function switching operation member 4 is rotated in the circumferential direction (the direction of the arrow B) of the interchangeable lens 1, a power zoom speed at which a user wants to drive is set by a later-described method. In the power zoom mode, the lens control unit 11 uses the power zoom speed changeover detection mechanism 30 to detect the power zoom speed which is set by switching zoom speeds.

In the super macro mode, the zoom mechanism switching operation member 4 is a mechanism that does not rotate in the circumferential direction (the direction of the arrow B) of the interchangeable lens 1.

In the super macro mode, the lens control unit 11 electrically drives and controls the second zoom group (2G) 7 and the third zoom group (3G) 8 in accordance with the positional relationship information of the second zoom group (2G) 7 and the third zoom group (3G) 8 previously stored in the storage unit 10. At this moment, the focus lens group 9 may be also driven to a preset position.

The zoom lock SW 5 is, e.g., a mechanical lock mechanism having a button. The zoom lock SW 5 is a function that allows switching the super macro mode, the power zoom mode, and the mechanical manual mode with the button of the zoom lock SW 5 being pressed when the mode is switched to one of the super macro mode, the power zoom mode, and the mechanical manual mode by a switching operation of the zoom function switching operation member 4. Therefore, when the button of the zoom lock SW 5 is not pressed, this function does not allow switching the super macro mode, the power zoom mode, and the mechanical manual mode.

In this interchangeable lens 1, although the mode is shifted by the zoom function switching operation member 4, the super macro mode, the power zoom mode, and the mechanical manual mode may be switched by the zoom lock SW 5, respectively.

In this interchangeable lens 1, the zoom function switching operation member 4 switches to one of the super macro mode, the power zoom mode, and the mechanical manual mode, i.e., a drive mechanism configured to drive the second zoom group (2G) 7 and the third zoom group (3G) 8 in accordance with a difference in position of the zoom function switching operation member 4 in the direction of the arrow A.

For example, operating in the mechanical manual mode is desired, an excitation position of the stepping motor of the second group drive mechanical mechanism 12 shifts. In the mechanical manual zoom, since driving is effected by external force from an operation of a user and the like, a pulse count number (a count number of drive pulses) of the stepping motor also shifts. Therefore, in case of detecting a relative position, to correct the shifted position, an initial position must be detected by initial drive in accordance with each zoom function switching.

The initial drive performed for each operation for switching to one of the super macro mode, the power zoom mode, and the mechanical manual mode using the zoom function switching operation member 4 results in wait for an initial drive time, and deterioration of operability for the user occurs. When both the second group drive mechanical mechanism 12 and the third group drive mechanism 17 drive for absolute position detection, the initial drive does not have to be performed. However, the linear encoder and others which are used for detecting an absolute position are expensive elements having a large size, and hence a problem of an increase in size or cost of the apparatus occurs.

According to this embodiment, one of the mechanisms is used for detecting an absolute position, and the other is used for detecting a relative position, whereby the initial drive is avoided and the above-described problem can be eliminated.

Therefore, in this interchangeable lens 1, the linear encoder 16 detects an absolute position of the second zoom group (2G) 7, the third group reference position detection unit 19 detects a reference position of the third zoom group (3G) 8, and an absolute position of the third zoom group (3G) 8 is acquired on the basis of this reference position and detection of the relative position based on a step number of the 3G actuator 18 that drives the third zoom group (3G) 8. As a result, this interchangeable lens 1 realizes a low cost and space saving without deteriorating the operability.

A configuration of the zoom group mechanism will now be described.

Figure 6:
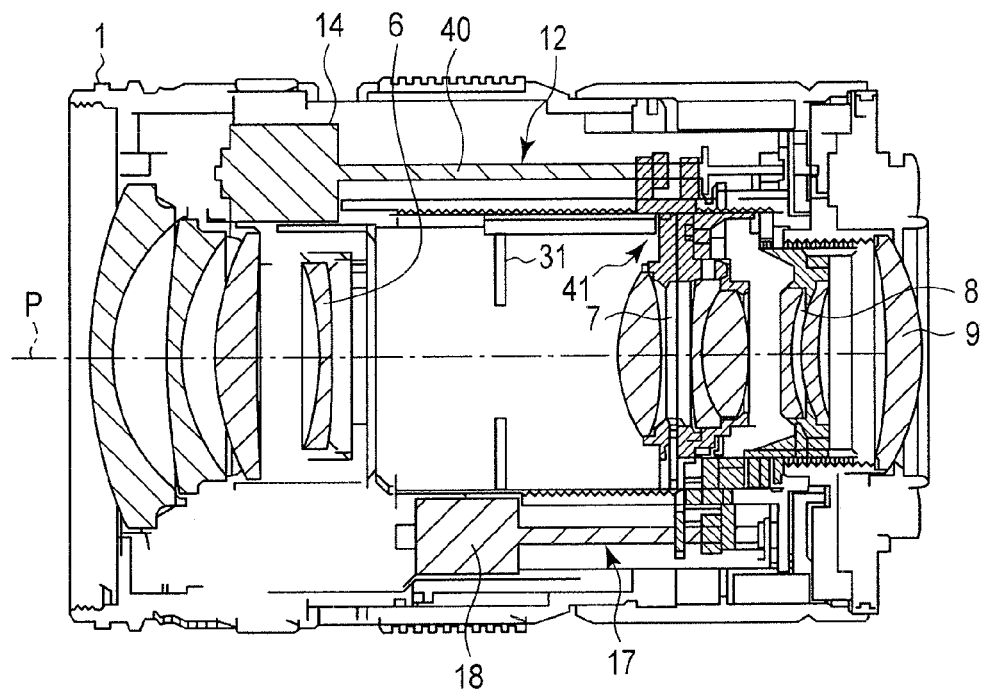
FIG. 6 is a structural view showing the optical device.

FIG. 6 shows a structural view of this interchangeable lens 1. As described above, in this interchangeable lens 1 are provided the first zoom group 6, the second zoom group (2G) 7, the third zoom group (3G), and the fourth zoom group 9. The second group drive mechanical mechanism 12 moves the second zoom group (2G) 7 in the direction of the optical axis P. The third group drive mechanism 17 moves the third zoom group (3G) 8 in the direction of the optical axis P.

The second group drive mechanical mechanism 12 comprises the 2G zoom actuator 14 such as a stepping motor. A 2G screw 40 is provided to the 2G zoom actuator 14. The second zoom group (2G) 7 is provided to the 2G screw 40 through a coupling mechanism 41 constituted of, e.g., a nut. The second group drive mechanical mechanism 12 includes a power-manual zoom switching mechanism.

Figure 7:
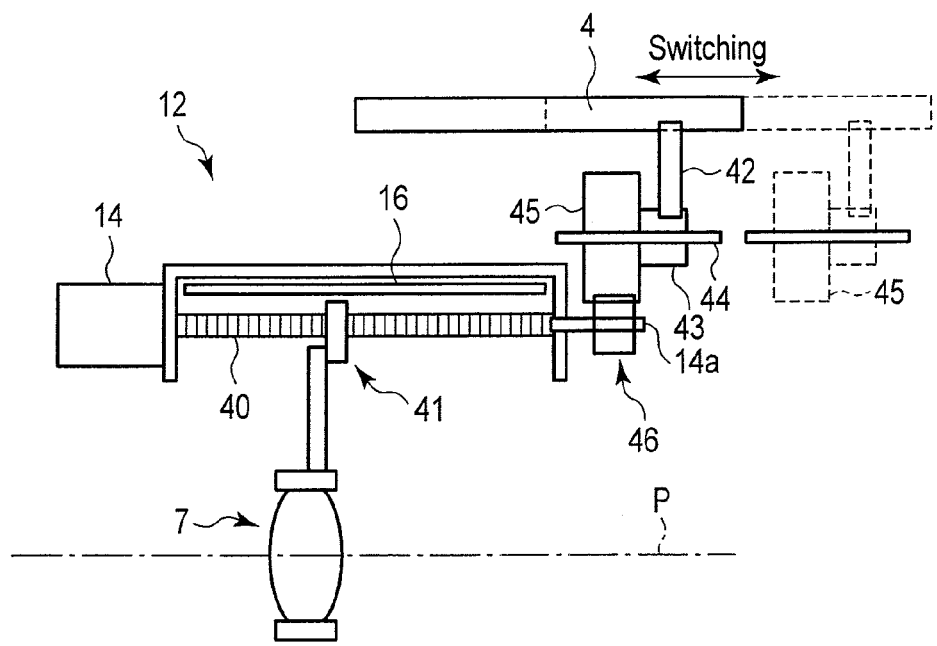
FIG. 7 is a structural view showing a power-manual zoom switching mechanism of a second group drive mechanical mechanism in the optical device.

FIG. 7 shows a structural view of the power-manual zoom switching mechanism of the second group drive mechanical mechanism 12.

The manual mechanism in the second group drive mechanical mechanism 12 comprises a support member 42 provided to the zoom function switching operation member 4, a rotation support member 43 provided to the support member 42, a speed-up gear 45 rotatably provided to the rotation support member 43 through a shaft 44, and a motor shaft gear 46 that meshes with the speed-up gear 45.

In the manual mechanism, when the zoom function switching operation member 4 is switched to a position of the manual zoom, the speed-up gear 45 is coupled with the motor shaft gear 46 in a clutching manner as shown in FIG. 7. When the zoom function switching operation member 4 rotates in the circumferential direction (the direction of the arrow B) of the interchangeable lens 1 by an operation of a user in this state, the zoom function switching operation member 4 overcomes detent torque of the 2G zoom actuator 14 and rotates the motor shaft gear 46. As a result, the second zoom group (2G) 7 moves in the direction of the optical axis P.

On the other hand, the power mechanism comprises the 2G zoom actuator 14 such as a stepping motor, a motor shaft 14a of the 2G zoom actuator 14, and the 2G screw 40 provided to the motor shaft 14a.

When the zoom function switching operation member 4 is switched to a position of the power zoom, the support member 42, the rotation support member 43, or the speed-up gear 45 which is the manual mechanism retract as indicated by a dotted line in FIG. 7. With this retraction, the speed-up gear 45 moves away from the motor shaft gear 46, and the speed-up gear 45 and the motor shaft gear 46 are decoupled. In a state that the power zoom is ON, when an instruction of the power zoom is issued to the second group drive mechanical mechanism 12 from the lens control unit 11, the 2G screw 40 rotates by driving of the 2G zoom actuator 14, the rotation of the 2G screw 40 moves the second zoom group (2G) 7 in the direction of the optical axis P.

The linear encoder 16 detects an absolute position of the second zoom group (2G) 7. The linear encoder 16 is an electrical component such as a displacement sensor which is of a resistance slider type.

The lens control unit 11 constantly fetches an absolute position of the second zoom group (2G) 7 detected by the linear encoder 16 irrespective of the super macro mode, the power zoom mode, and the mechanical manual mode.

Figure 8:
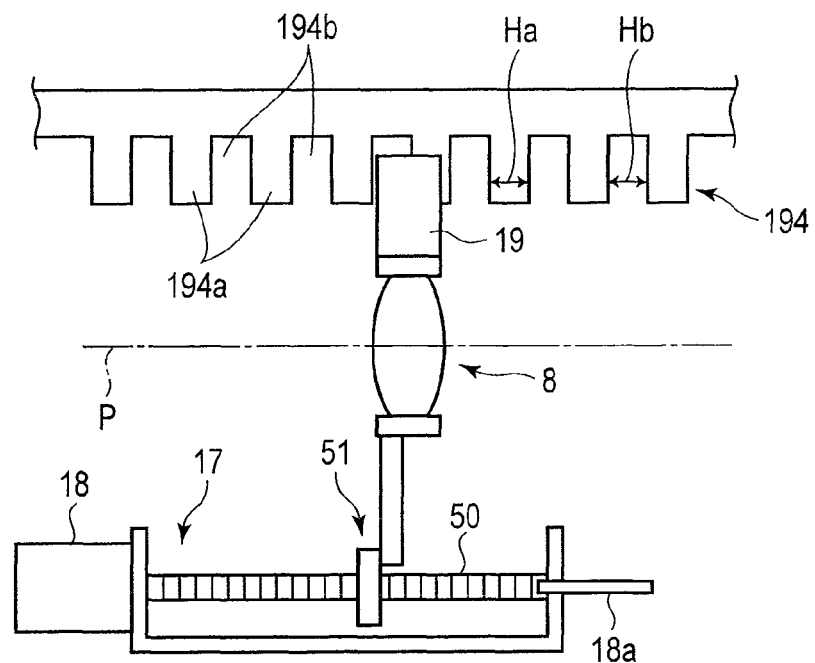
FIG. 8 is a structural view showing a third group drive mechanism in the optical device.

FIG. 8 shows a structural view of the third group drive mechanism 17.

The third group drive mechanism 17 comprises the 3G zoom actuator 18 such as a stepping motor, a motor shaft 18a of the 3G zoom actuator 18, and a 3G threaded lead screw 50 provided to the motor shaft 18a. The third zoom group (3G) 8 is provided to the 3G threaded lead screw 50 through a coupling mechanism 51 formed of, e.g., a nut.

The third group drive mechanism 17 detects a reference position of the third zoom group (3G) 8 based on detection of a reference position by the reference position detection element such as a PI of the third group reference position detection unit 19.

The third group drive mechanism 17 relatively drives the third zoom group (3G) 8 from the reference position by using the 3G zoom actuator 18, e.g., a stepping motor even in the manual zoom mode.

The third group drive mechanism 17 does not drive the third zoom group (3G) 8 in response to an external input.

The third group drive mechanism 17 drives the third zoom group (3G) 8 in accordance with the positional relationship information of the second zoom group (2G) 7 and the third zoom group (3G) 8 stored in the storage unit 10 as shown in FIG. 4 in response to an instruction from the lens control unit 11, namely, it drives the third zoom group (3G) 8 to follow a position of the second zoom group (2G) 7.

The third group drive mechanism 17 drives the third zoom group (3G) 8 at a moving speed associated with a speed (a speed specification) when the zoom function switching operation member 4 is rotated in the circumferential direction (the direction of the arrow B) of the interchangeable lens in the power zoom mode.

The third group reference position detection unit 19 acquires a reference position of the third zoom group (3G) 8 which is the second lens group as described above and, for example, a photo-interrupter (PI) is used. The third group reference position detection unit 19 moves in the direction of the optical axis P integrally with the third zoom group (3G) 8. As show in FIG. 8, the third reference position detection unit 19 uses, for example, a photo-interrupter (PI) as a detection element configured to acquire a reference position of the third zoom group (3G) 8, and it includes a light-emitting portion 191 and a light-receiving portion 192.

Figure 9:
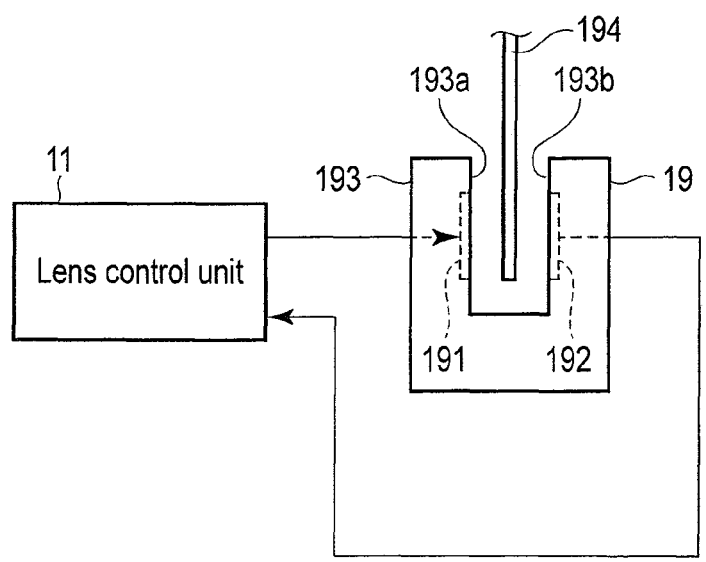
FIG. 9 is an electrical circuit diagram showing a detection system including a photo-interrupter in the optical device.

As shown in FIG. 9, a main body of the photo-interrupter (PI) (which will be referred to as a PI main body hereinafter) 193 is formed into a U-like shape. In the PI main body 193, respective opposed surfaces 193a and 193b which face each other are formed. The light-emitting portion 191 is provided on one opposed surface 193a of the PI main body 193. The light-receiving portion 192 is provided on the other opposed surface 193b. The light-emitting portion 191 and the light-receiving portion 192 are arranged to face each other. The light-emitting portion 191 receives a light emission control signal from the lens control unit 11 and emits light. The lens control unit 11 outputs, e.g., the light emission control signal which enables the light-emitting portion 191 to continuously emit light, whereby the light-emitting portion 191 continuously emits light. The light-receiving portion 192 receives the light emitted from the light-emitting portion 191 and outputs an H-level light reception signal (an H-level signal) indicative of this light reception. If the light-receiving portion 192 does not receive the light emitted from the light-emitting portion 191, it outputs a low-level light non-reception signal (an L-level signal).

A plate-like comb tooth member 194 is arranged in a space between the respective opposed surfaces 193a and 193b, which face each other, in the third group reference position detection unit 19. Light-shielding regions (which will be referred to as light-shielding wall bodies hereinafter) 194a and transmitting regions (which will be referred to as open spaces hereinafter) 194b are provided to the comb tooth member 194. Each light-shielding wall body 194a blocks light between the light-emitting portion 191 and the light-receiving portion 192. Each open space 194b is in a transmission state that light is transmitted between the light-emitting portion 191 and the light-receiving portion 192. The light-shielding wall bodies 194a and the open spaces 194b are alternately aligned along the direction of the optical axis P and form the comb tooth member 194 into a comb tooth shape. Each light-shielding wall body 194a is formed with a first width Ha (PI blade width) in the direction of the optical axis P. Each open space 194b is formed with a second width Hb in the direction of the optical axis P. The first width Ha and the second width Hb are formed with, e.g., the same length in the direction of the optical axis P.

Figure 10:
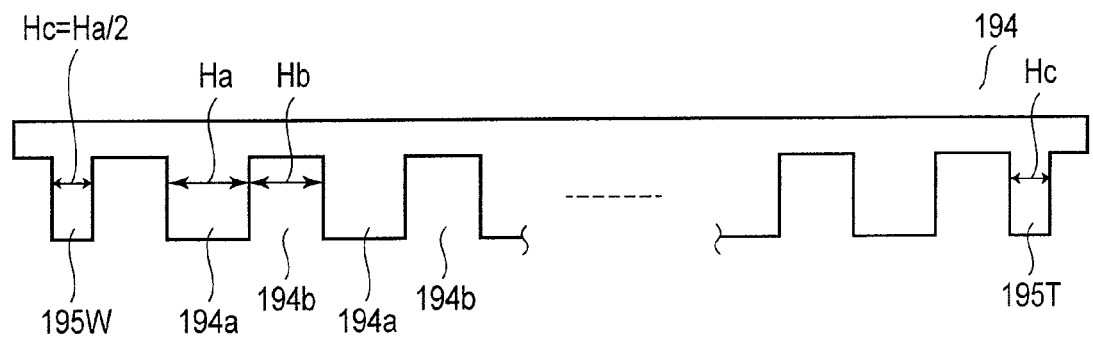
FIG. 10 is a view showing a specific example of a comb tooth member in the optical device.

FIG. 10 shows a specific example of the comb-tooth member 194. The comb tooth member 194 is formed by alternating aligning the light-shielding wall bodies 194a and the open spaces 194b. In the comb tooth member 194, as specific position for initializing a position of the third zoom group (3G) 8, for example, one Wide end comb tooth 195W is formed on the wide angle (Wide) end side of the optical zoom, and one Tele end comb tooth 195T is formed on the Tele end side of the same. Each of the Wide end comb tooth 195W and the Tele end comb tooth 195T is formed with a third width Hc. The third width Hc is formed to be ½ of the first width Ha of each light-shielding wall body 194a.

In the comb tooth body 194, the light-shielding wall bodies 194a are formed with the first width Ha, and the Wide-end comb tooth 195W and the Tele-end comb tooth 195T are formed with the third width (Hc=Ha/2), but the present invention is not restricted to thereto, and a ratio of the first width Ha and the third width Hc may be a different ratio.

When each first width Ha of the light-shielding wall bodies 194a is converted into a drive pulse number for driving the 3G zoom actuator 18, e.g., a stepping motor in the third group drive mechanism 17, it corresponds to, e.g., 4 pulses+α. The 4 pulses are just an example of the pulse number corresponding to one period of an excitation pattern of a later-described stepping motor. Besides, for example, 8, 16, or 32 pulses may be adopted. α is a correction coefficient considering a shift length caused due to, e.g., a response speed of the third group reference position detection unit (the photo-interrupter (PI)) 19, and it is, e.g., a drive amount of 1 pulse. The correction coefficient α is, e.g., "1" or "2".

If the first width Ha of the light-shielding wall body 194a, a drive amount of the 3G zoom actuator 18 such as a stepping motor per pulse, i.e., a moving length of the third zoom group (3G) 8, and a drive pulse number given to the 3G zoom actuator 18 are known, the lens control unit 11 can predict the H-level signal (corresponding to a position of the open space 194a) and the L-level signal (corresponding to a position of the light-shielding wall body 194a) output from the third group reference position detection unit (e.g., the photo-interrupter (PI)) 19. The lens control unit 11 adds or subtracts the H-level signal and the L-level signal to determine whether the third zoom group (3G) 8 is placed on the Wide-end comb tooth 195W or the Tele-end comb tooth 195T or whether it is placed between the Wide-end comb tooth 195W and the Tele-end comb tooth 195T.

The lens control unit 11 receives positional information of the third zoom group (3G) 8 detected by the third group reference position detection unit 19 and recognizes a reference position of the third zoom group (3G) 8 driven by the third group drive mechanism 17 by the initial drive when a power supply is turned on. For example, the lens control unit 11 recognizes a relative position with respect to the reference position of the third zoom group (3G) 8 by drive of the 3G zoom actuator 18 such as a stepping motor.

The lens control unit 11 controls movement of the third zoom group (3G) 8 based on the positional information of the second zoom group (2G) 7 detected by the second group absolute position detection unit 16 as the first lens group position detection unit and the positional information stored in the storage unit 10. It is to be noted that the lens control unit 11 outputs drive pulses to the third group drive mechanism 17 that moves the third zoom group (3G) 8. The third group drive mechanism 17 inputs the drive pulse number from the lens control unit 11, drives the 3G zoom actuator 18, e.g., a stepping motor, and moves the third zoom group (3G) 8. Since the lens control unit 11 stores in a memory a moving length of the third zoom group (3G) 8 per pulse and hence can calculate a moving length of the third zoom group (3G) 8 from the drive pulse number output to the third group drive mechanism 17.

Meanwhile, the third zoom group (3G) 8 cannot move to follow the movement of the second zoom group (2G) 7 in some cases. In this case, for example, since the second zoom group (2G) 7 and the third zoom group (3G) 8 may possibly come into contact or collide with each other. For example, if the second zoom group (2G) 7 and the third zoom group (3G) 8 collide with each other, one or both of the 2G zoom actuator 14 such as a stepping motor that drive the second zoom group (2G) 7 and the 3G zoom actuator 18 that drive the second the third zoom group (3G) 8 lose steps, and positions of the second zoom group (2G) 7 and the third zoom group (3G) 8 cannot be detected in some cases. That is, a control state over the second zoom group (2G) 7 or the third zoom group (3G) 8 becomes abnormal.

Occurrence of this step-out will now be described with reference to FIG. 11. In the mechanical manual mode, the second zoom group (2G) 7 is driven by an operation of a user from the outside. The third zoom group (3G) 8 is moved to a position associated with a position of the second zoom group (2G) 7 to follow the movement of the second zoom group (2G) 7.

For example, it is assumed that the second zoom group (2G) 7 is present at a current position R1 and the third zoom group (3G) 8 is present at a current position R2. In a situation that the second zoom group (2G) 7 moves to a movement position E1 and the third zoom group (3G) 8 moves to a movement position E2 from this state, when the second zoom group (2G) 7 moves at a high speed by, e.g., zooming of the mechanical manual operation performed by the user, the third zoom group (3G) cannot follow the movement of the second zoom group (2G) 7 at the high speed in some cases. In such a case, the second zoom group (2G) 7 and the third zoom group (3G) 8 may collide with each other at, e.g., a position K and lose steps.

This apparatus has a configuration that, when the stepping motor of the 2G zoom actuator 14 or the 3G zoom actuator 18 loses steps in accordance with zooming and the control state becomes abnormal, the step-out state that the control is abnormal is detected and an operation for restoration processing is rapidly carried out.

The lens control unit 11 determines whether the control state of the third zoom group (3G) 8 is abnormal, i.e., whether step-out has occurred based on control positional information which is used for controlling movement of the third zoom group (3G) 8 and a signal associated with positional information of the third zoom group (3G) 8 detected by the third group reference position detection unit 19.

Specifically, the lens control unit 11 predicts predictive positional information of the third zoom group (3G) 8 based on the control positional information for controlling movement of the third zoom group (3G) 8, and it determines whether the control state of the third zoom group (3G) 8 is abnormal, i.e., whether the step-out has occurred based on this predictive positional information and the signal associated with the positional information of the third zoom group (3G) 8 detected by the third group reference position detection unit 19.

When it is determined that the position of the third zoom group (3G) 8 is abnormal and the step-out has occurred, the lens control unit 11 selects one initializing position from initializing positions stored in the storage unit 10 based on the positional information of the second zoom group (2G) 7 detected by the second group absolute position detection unit 16 and the positional information of the third zoom group (3G) 8 detected by the third group reference position detection unit 19, moves the third zoom group (3G) 8 to the one selected initializing position, and initializes the position and the positional information of the third zoom group (3G) 8 detected by the third group reference position detection unit 19.

In this case, the lens control unit 11 moves the third zoom group (3G) 8 to the initializing position that is present in a direction along which the second zoom group (2G) 7 and the third zoom group (3G) 8 do not mechanically interfere with each other in the initializing positions, and it initializes the positional information of the third zoom group (3G) 8 detected by the third group reference position detection unit 19.

The position to which the third zoom group (3G) 8 is initialized is associated with each position, e.g., a wide-angle (Wide) end, a telescopic (Tele) end, and an intermediate position between the wide-angle (Wide) end and the telescopic (Tele) end.

The lens control unit 11 moves the third zoom group (3G) 8 to the initializing position where the mechanical interference does not occur, which is also the initializing position closest to the position of the third zoom group (3G) detected by the third group reference position detection unit 19 in the initializing positions, and it initializes the position and the positional information of the third zoom group (3G) 8.

Meanwhile, a resolution error of the linear encoder 16 that detects an absolute position of the second zoom group (2G) 7 affects defocus (FC), and an image becomes blurry when a resolution of the linear encoder 16 is coarse and a detection resolution is low.

Figure 12:
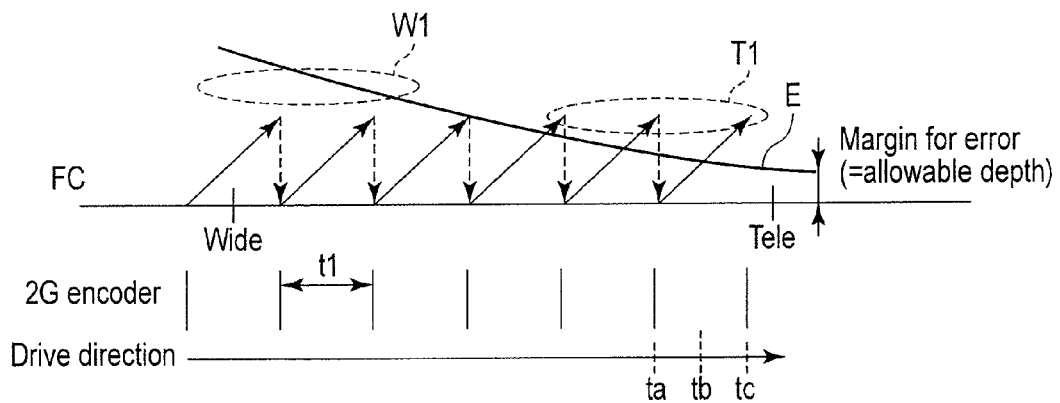
FIG. 12 is a view showing a relationship between defocus (FC) and a resolution of the second zoom group (2G) when a resolution of a linear encoder in the optical device is insufficient.

FIG. 12 shows a relationship between defocus (FC) and a resolution of the linear encoder 16 of the second zoom group (2G) 7 when a resolution of the linear encoder 16 is insufficient. This drawing shows a margin for error (an allowable depth) E between the Wide side and the Tele side. The linear encoder 16 of the second zoom group (2G) 7 detects an absolute position of the second zoom group (2G) 7 every interval t1. The third zoom group (3G) 8 is moved in the direction of the optical axis P every time a variation t1 of the absolute value of the second zoom group (2G) 7 detected by the linear encoder 16 is detected. That is, after the variation is detected in the positional detection of the second zoom group (2G) 7, the third zoom group (3G) 8 is moved to a position associated with a position of the second zoom group (2G) 7 based on the relative positional relationship shown in FIG. 4.

During the interval t1 that the second zoom group (2G) 7 is moving, the third zoom group (3G) 8 is pausing. Therefore, although there occurs no problem on the Wide side W1 having a large allowable depth, a moving length of the second zoom group (2G) 7 directly leads to defocus (FC) and exceeds the allowable depth (the margin for error) on the Tele side T1 having a small allowable depth, and hence blur of an image occurs. Therefore, a resolution of the linear encoder 16 must be increased, and followability of the third zoom group (3G) 8 with respect to the second zoom group (2G) 7 must be improved.

Figure 13:
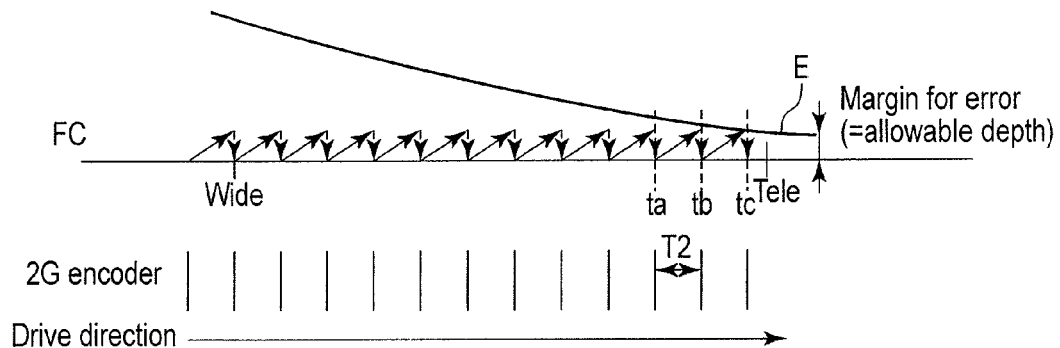
FIG. 13 is a view showing a relationship between defocus (FC) and a resolution of the second zoom group when a judgment threshold is changed in accordance with a zoom position of the second zoom group in the optical device.

FIG. 13 shows a relationship between defocus (FC) and a resolution of the linear encoder 16 of the second zoom group (2G) 7 when a resolution of the linear encoder 16 is sufficient. At positions ta, tb, and tc (an interval t2) where a variation of an output from the linear encoder 16 of the second zoom group (2G) 7 becomes an interval shorter than the interval t1, the movement of the third zoom group (3G) 8 is controlled.

Figure 14:
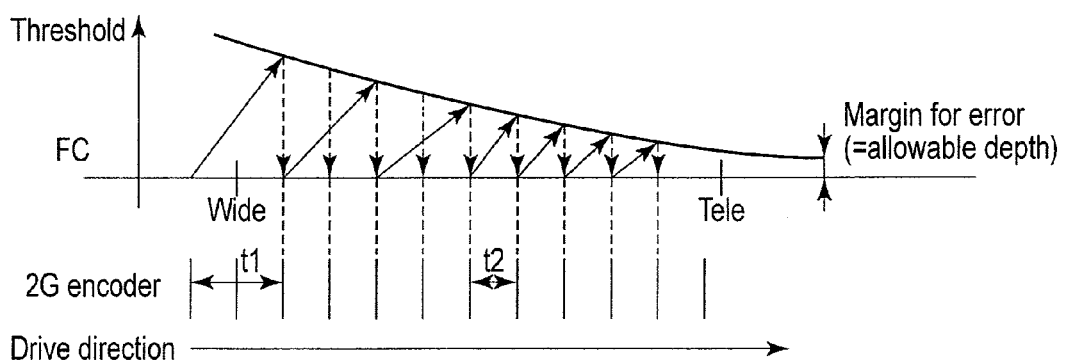
FIG. 14 is a view showing a relationship between defocus (FC) and a resolution of the second zoom group (2G) when the judgment threshold is changed in accordance with a zoom position of the second zoom group (2G) 7 in the optical device.

FIG. 14 shows a relationship between defocus (FC) and a resolution of the linear encoder 16 of the second zoom group (2G) when a judgment threshold is changed in accordance with a zoom position of the second zoom group (2G) 7. On the Wide side having the large allowable depth, the lens control unit 11 moves the third zoom group (3G) 8 in the direction of the optical axis P every time a variation of the absolute value of the second zoom group (2G) 7 detected by the linear encoder 16 becomes the interval t1. On the Tele side T1 having the small allowable depth, the lens control unit 11 moves the third zoom group (3G) 8 in the direction of the optical axis P every time a variation of the absolute value of the second zoom group (2G) 7 detected by the linear encoder 16 becomes the interval t2. The interval t1 is set longer than the interval t2 (t1>t2).

An operation of the thus configured interchangeable lens will now be described.

First, the lens control unit 11 starts up a zoom operation in accordance with a zoom start-up flowchart shown in FIG. 15.

The lens control unit 11 detects the zoom mode at a step S1 and executes zoom mode processing at a step S2. Then, the lens control unit 11 waits at a step S3 and then determines whether is a current state is abnormal at a step S4. The lens control unit 11 returns to the step S1 If the state is not abnormal or terminates the zoom start-up if the state is abnormal.

The zoom mode detection will now be described with reference to a zoom mode detection flowchart depicted in FIG. 16.

The lens control unit 11 reads an encoder value from a gray code type encoder of the zoom function switching operation member 4 at a step S10 and determines whether the zoom mode is the mechanical manual zoom mode at a step S11. If the zoom mode is the mechanical manual zoom mode as a result of this determination, the lens control unit 11 stores the mechanical manual zoom mode and terminates the zoom mode detection.

If the zoom mode is not the mechanical manual zoom mode, the lens control unit 11 determines whether the zoom mode is a power zoom mode at a step S12. If the zoom mode is not the power zoom mode as a result of this determination, the lens control unit 11 sets the zoom mode to a super macro mode at a step S13. On the other hand, if the zoom mode is the power zoom mode, the lens control unit 11 determines whether the previous mode is the mechanical manual zoom mode at a step S14. If the previous mode is not the mechanical manual zoom mode as a result of this determination, the lens control unit 11 stores the power zoom mode and terminates the zoom mode detection. If the previous mode is the mechanical manual zoom mode, the lens control unit 11 corrects an excitation position at a step S15.

Figure 17:
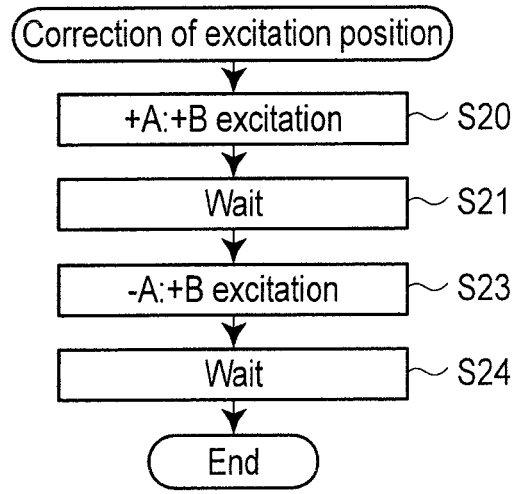
FIG. 17 is a excitation position correcting flowchart in the optical device.

The correction of the excitation position at the step S15 will now be described with reference to an excitation position correcting flowchart depicted in FIG. 17.

As each of the 2G zoom actuator 14 and the 3G zoom actuator 18, for example, a stepping motor is used. As the stepping motor, a 2-2-phase stepping motor is used.

Figure 18:
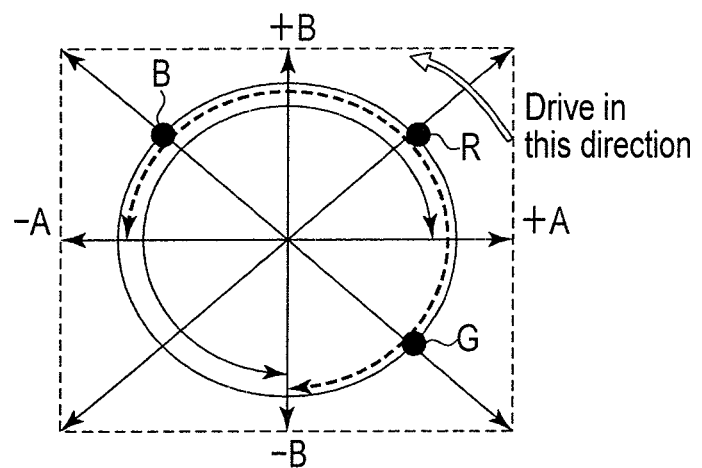
FIG. 18 is a view for explaining correction of excitation position in the optical device.

In regard to the 2-2-phase stepping motor, as shown in FIG. 18, a phase A has excitation positions of +A and −A. A phase B has excitation positions of +B and −B. In case of 2-2-phase excitation drive, representing the excitation by combinations of (the phase A, the phase B), there are four excitation patterns of (+A, +B), (−A, −B), (+A, −B), and (−A, +B). Each excitation pattern corresponds to 1 pulse, and hence 4 pulses correspond to one period of the excitation pattern. When the rotor of the stepping motor is present at each position in the range indicated by a dotted line, the rotor of the stepping motor is absorbed at a position of a point. R by setting the excitation pattern as +A:+B. When the rotor of the stepping motor is present at each position in the range indicated by a solid line, the rotor of the stepping motor is absorbed at a position of a point. B by setting the excitation pattern as −A:+B.

Therefore, in case of correcting the excitation position, the lens control unit 11 performs excitation of +A:+B at a step S20 and waits at a step S21. Then, the lens control unit 11 performs excitation of −A:+B at a step S22 and waits at a step S23. As a result, the excitation position is corrected to the point B. A time for waiting at each of the steps S21 and S23 is preset. When a driving direction of the stepping motor is reversed, at the step S22, excitation of +A:−B may be carried out, and the excitation position may be corrected to a point G in place of the point B. To shorten a restoration time, all the excitation patterns are not executed.

Meanwhile, in case of the 1-2-phase excitation drive, in addition to (+A, +B), (−A, −B), (+A, −B), and (−A, +B) at the 2-2-phase excitation position, there are four excitation patterns of (+A, 0), (−A, 0), (0, +B), and (0, −B) at the 1-2-phase excitation position. Since each excitation pattern corresponds to 1 pulse, 8 pulses correspond to 1 period of the excitation pattern. Further, when the intermediate dividing positions are increased, 1 period can correspond to 16 pulses, 32 pulses.... Furthermore, the first width Ha of each of the light-shielding wall bodies 194a may be set to 8 pulses+α, 16 pulses+α, and others in accordance with the pulse number corresponding to 1 period.

The zoom mode processing at the step S2 will now be described with reference to a zoom mode processing flowchart depicted in FIG. 19.

The lens control unit 11 determines whether the mechanical manual zoom mode has been set based on the stored zoom mode information. When a result of this determination reveals that the mechanical manual zoom mode has been set, the lens control unit 11 carries out the mechanical manual zoom processing at a step S31.

If the mechanical manual zoom mode has not been set, the lens control unit 11 determines whether the power zoom mode has been set at a step S32. When a result of this determination reveals that the power zoom mode has been set, the lens control unit 11 performs the power zoom processing at a step S33.

If the power zoom mode has not been set, the lens control unit 11 performs the super macro processing at a step S34.

The mechanical manual zoom mode processing (the step S31) will now be described with reference to a mechanical manual zoom mode processing flowchart depicted in FIG. 20.

The lens control unit 11 detects an absolute position of the second zoom group (2G) 7 by using the linear encoder 16 at a step S40.

Figure 23:
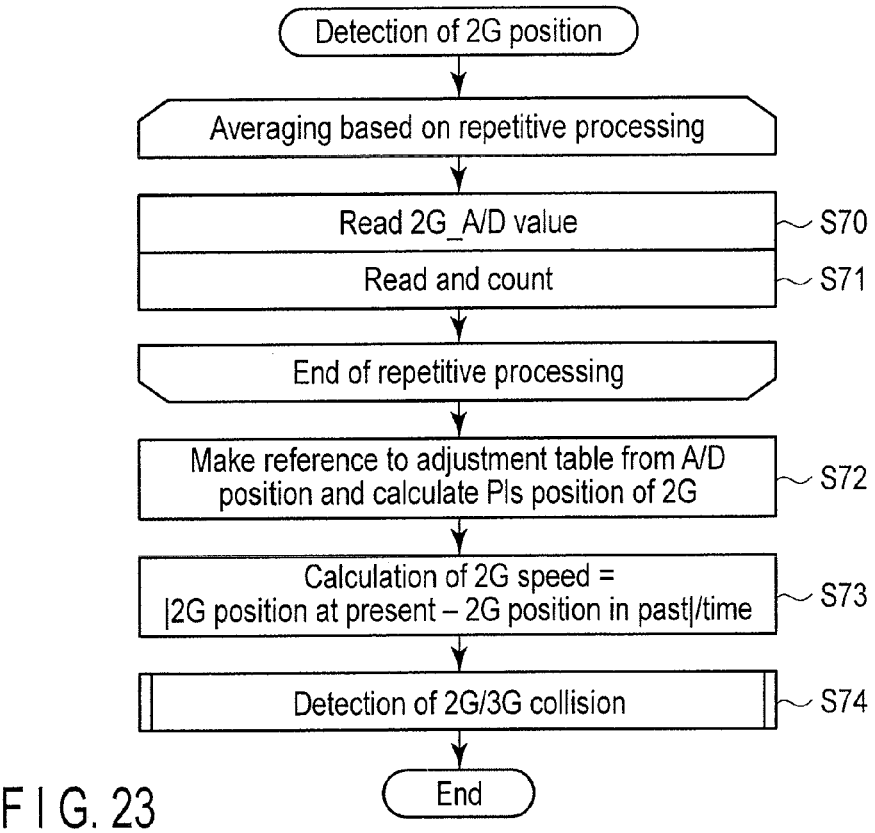
FIG. 23 is a position detecting flowchart of the second zoom group (2G) in the optical device.

At the step S40, the lens control unit 11 executes 2G/3G collision detection processing at a later-described step S74 shown in FIG. 23 and detects whether a control state of the third zoom group (3G) 8 is abnormal, i.e., whether step-out has occurred.

At a step S41, the lens control unit 11 determines whether the control state of the third zoom group (3G) 8 is abnormal, i.e., whether step-out has occurred.

When the control state of the third zoom group (3G) 8 is not abnormal as a result of this determination, the lens control unit 11 detects a current position of the second zoom group (2G) 7 by using the linear encoder 16 and sequentially updates the current position of the second zoom group (2G) 7 at a step S42.

At a step S43, the lens control unit 11 updates the judgment threshold in accordance with a zoom position of the second zoom group (2G) 7 as shown in, e.g., FIG. 14.

At a step S44, the lens control unit 11 obtains an absolute value of a difference between the current position of the second zoom group (2G) 7 and a past position of the second zoom group (2G) 7 (e.g., a position obtained by tracing back a time for the interval t1 or t2 shown in FIG. 14), and it determines whether the absolute value of this difference is larger than an addition amount His_A of the judgment threshold and a hysteresis amount.

When the absolute value of the difference is larger than the addition amount His_A as a result of this determination, the lens control unit 11 reads such positional relationship information between the second zoom group (2G) 7 and the third zoom group (3G) 8 as shown in FIG. 4 that is stored in the storage unit 10 at a step S45. The lens control unit 11 drives the third zoom group (3G) 8 to follow the position of the second zoom group (2G) 7 at a step S46.

Although the lens control unit 11 performs 3G fixed speed drive of a later-described step S93 in FIG. 25 in the 3G drive processing at the step S46, it detects whether the control state of the third zoom group (3G) 8 is abnormal, i.e., whether step-out has occurred based on control positional information required for performing movement control over the third zoom group (3G) 8 and positional information of the third zoom group (3G) detected by the third group reference position detection unit 19.

At a step S47, the lens control unit 11 determines whether the control state of the third zoom group (3G) 8 is abnormal, i.e., whether step-out has occurred based on a result of the detection at the step S46.

When it is determined that the absolute value of the difference is larger than the addition amount His_A and the abnormality is not detected, or when the absolute value of the difference is smaller than the addition amount His_A, the lens control unit 11 repeatedly executes the step S40 to the step S47.

When it is determined that the control state of the third zoom group (3G) 8 is abnormal and step-out has occurred as results of the determinations at the steps S41 and S47, the lens control unit 11 advances to a step S48 to perform restoration processing and terminate the mechanical manual zoom mode processing.

Figure 20:
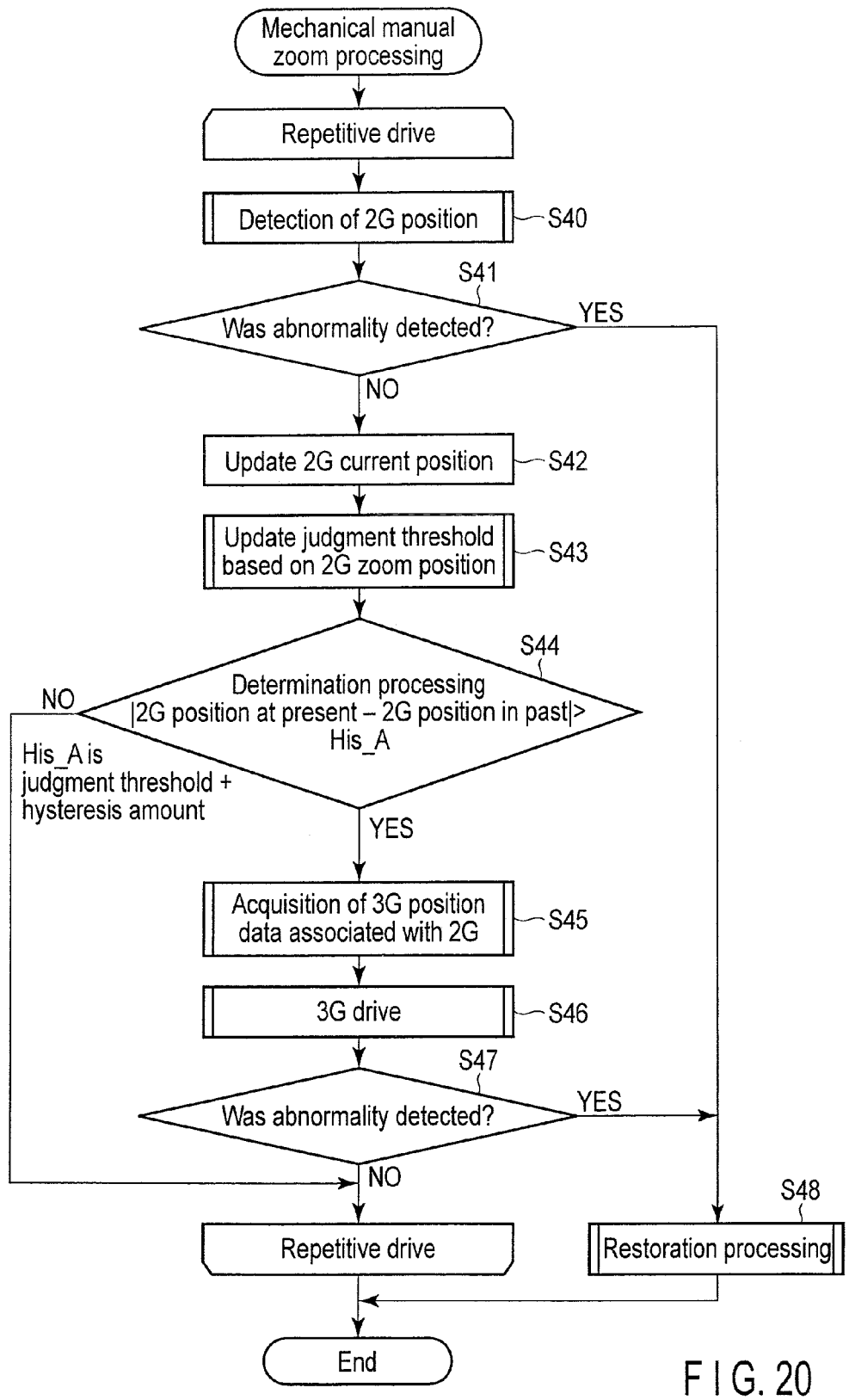
FIG. 20 is a mechanical manual zoom mode processing flowchart in the optical device.

Although not shown in FIG. 20, when the zoom switching operation unit is operated in the direction of the arrow A depicted in FIG. 1 during the mechanical manual zoom processing, the mechanical manual zoom processing is terminated. Furthermore, the mode processing (FIG. 19) is terminated, and the zoom mode detection at the step S1 is executed through the steps S3 and S4 in the zoom start-up processing (zoom activation processing) (FIG. 15).

The power zoom processing (the step S33) will now be described with reference to a power zoom processing flowchart depicted in FIG. 21.

At a step S50, the lens control unit 11 detects a set speed of the second zoom group (2G) 7 in the power zoom.

At a step S51, the lens control unit 11 detects a position of the second zoom group (2G) 7 by the linear encoder 16.

At a step S52, the lens control unit 11 sequentially updates the current position of the second zoom group (2G) 7.

The lens control unit 11 drives the second zoom group (2G) 7 at a step S53, and it reads such positional relation information of the second zoom group (2G) 7 and the third zoom group (3G) 8 as shown in FIG. 4 stored in the storage unit 10 and drives the third zoom group (3G) 8 to follow the position of the second zoom group (2G) 7 at a step S54.

Figure 22:
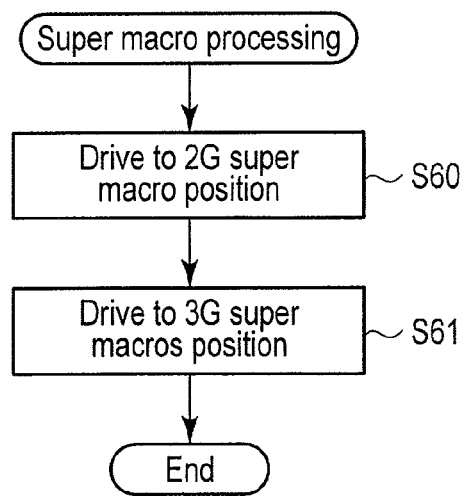
FIG. 22 is a super macro processing flowchart in the optical device.

The super macro processing (the step S34) will now be described with reference to a super macro processing flowchart shown in FIG. 22.

The lens control unit 11 drives the second zoom group (2G) 7 to a preset super macro position at a step S60, and it drives the third zoom group (3G) 8 to a preset super macro position at a step S61.

Detection of a position of the second zoom group (2G) 7 (the steps S40 and S51) will now be described with reference to a position detection flowchart of the second zoom group (2G) 7 shown in FIG. 23.

The lens control unit 11 performs A/D conversion with respect to an output signal from the linear encoder 16 that detects a position of the second zoom group (2G) 7 at a step S70, and it counts the number of times that the A/D conversion is performed at a step S71. The lens control unit 11 repeats the steps S70 and 71, sequentially performs the A/D conversion of each output signal from the linear encoder 16, counts the number of times of performing the A/D conversion, and calculates an average value of the read A/D conversion values upon completion of the A/D conversion effected for the predetermined number of times.

At a step S72, the lens control unit 11 makes reference to adjustment data representing a relationship between outputs from the linear encoder 16 and drive pulses of the second zoom group (2G) 7 stored in the storage unit 10 and calculates a pulse position of the second zoom group (2G) 7 from an output value (an average value) of the linear encoder 16.

Figure 21:
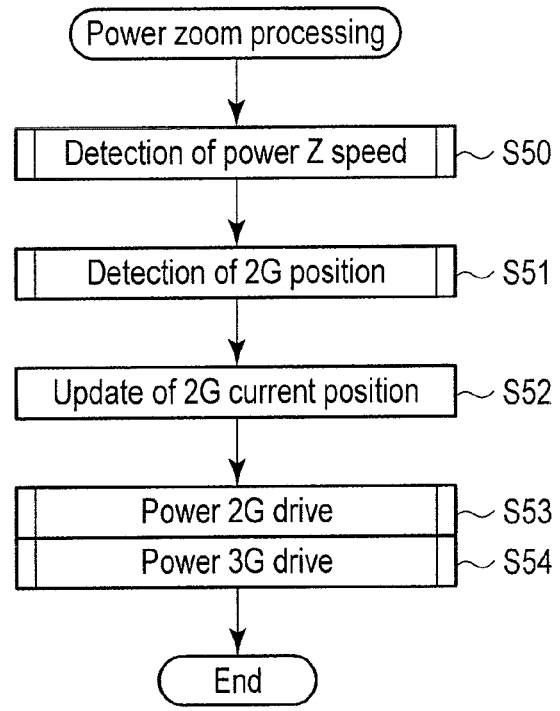
FIG. 21 is a power zoom processing flowchart in the optical device.

Then, the lens control unit 11 executes the processing of each of the steps S73 and 74 only at the time of the 2G position detection processing of the step S40 in the mechanical manual zoom processing shown in FIG. 20, but it does not execute the same at the time of the 2G position detection processing of the step S51 in the power zoom processing shown in FIG. 21.

At a step S73, the lens control unit 11 obtains an absolute vale of a difference between the current position of the second zoom group (2G) 7 and a past position of the second zoom group (2G) 7 (e.g., a position obtained by tracing back a time for the interval t1 or t2 shown in FIG. 14), divides the absolute value of this difference by a time, and thereby calculates a speed of the second zoom group (2G) 7.

Figure 11:
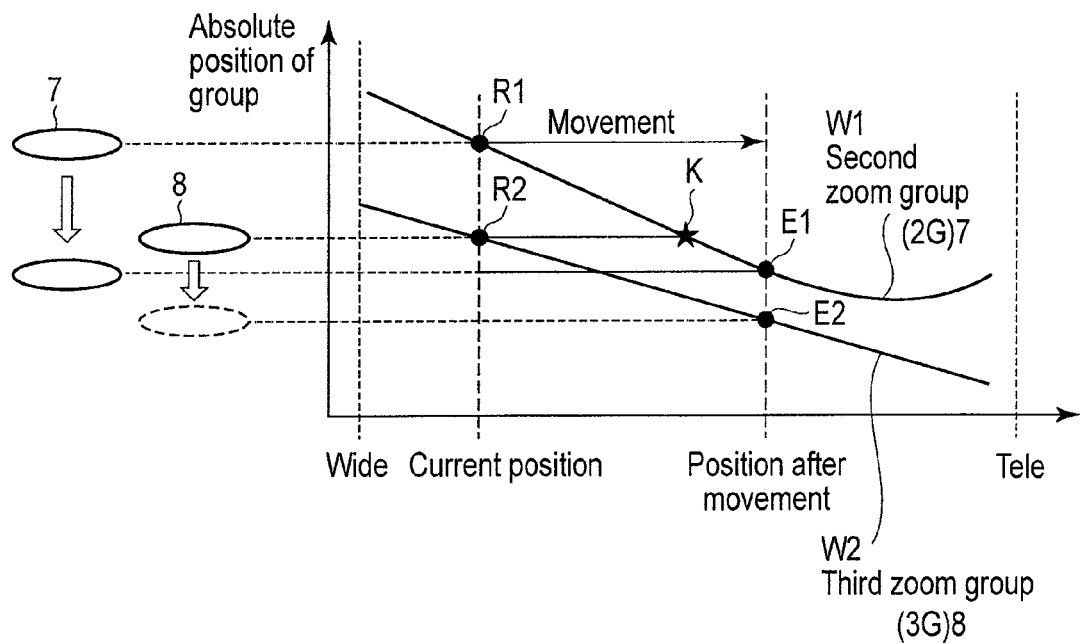
FIG. 11 is a view for explaining occurrence of step-out in the optical device.

At a step S74, the lens control unit 11 determines whether the second zoom group (2G) 7 has collided with the third zoom group (3G) 8 at, e.g. a position K shown in FIG. 11 and step-out has occurred.

The detail will be described later based on a 2G/3G collision detection flowchart shown in FIG. 28. This is the end of the description on the 2G position detection processing flowchart shown in FIG. 23.

Power Z speed detection (the step S50) will now be described with reference to a power Z speed detection flowchart depicted in FIG. 24.

At a step S80, the lens control unit 11 detects a zoom speed set by the zoom function switching operation member 4. When the zoom function switching operation member 4 is in the power zoom state, the lens control unit 11 detects a speed of power zoom set based on rotation of the zoom function switching operation member 4 in the direction B by a photographer on the basis of an output from the power zoom speed changeover detection mechanism 30. The lens control unit 11 performs A/D conversion with respect to an output signal from the power zoom speed changeover detection mechanism 30, and it counts the number of times of performing the A/D conversion at a step S81. The lens control unit 11 repeats the steps S80 and 81, performs the A/D conversion with respect to the output signal from the power zoom speed changeover detection mechanism 30, and counts the number of times of performing the A/D conversion. When the A/D conversion performed for the predetermined number of times is terminated, the lens control unit 11 calculates an average value of the read A/D conversion values.

At a step S82, the lens control unit 11 determines which one of first to third speeds when driving from a neutral position (no driving) toward the Wide direction and first to third speeds when driving toward the Tele direction is set from an output value (the average value) from the power zoom speed changeover detection mechanism 30.

The drive (the step S46) of the third zoom group (3G) 8 will now be described with reference to a third zoom group drive flowchart shown in FIG. 25.

At a step S90, the lens control unit 11 determines a profile of the third zoom group (3G) 8 from a moving speed of the second zoom group (2G) 7 (calculated at the step S73 in FIG. 23 which is executed in the 2G position detection of the step S40 in the mechanical manual zoom processing shown in FIG. 20), and calculates a speed of the third zoom group (3G) 8.

The lens control unit 11 performs initial excitation of the third zoom group (3G) 8 at a step S91, executes acceleration drive at a step S92 in accordance with the profile determined at the step S90, carries out drive at a predetermined speed for a predetermined amount at a step S93 when the speed calculated at the step S90 is reached, performs deceleration drive at a step S94 in accordance with the profile determined at the step S90, and executes holding excitation at a step S95.

Figure 26:
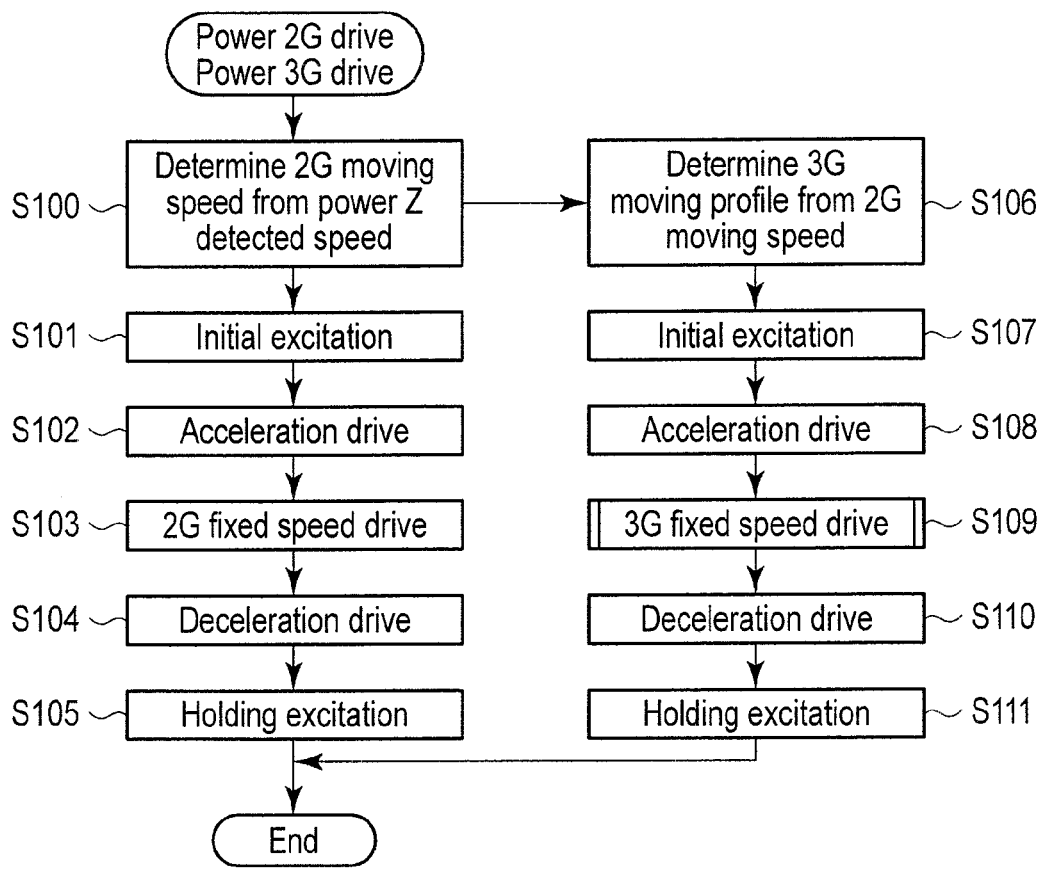
FIG. 26 is a second and third zoom group drive flowchart in the optical device.

The drive of the second zoom group (2G) 7 and the third zoom group (3G) 8 (the steps S53 and S54) will now be described with reference to a second and third zoom group drive flowchart shown in FIG. 26.

Figure 24:
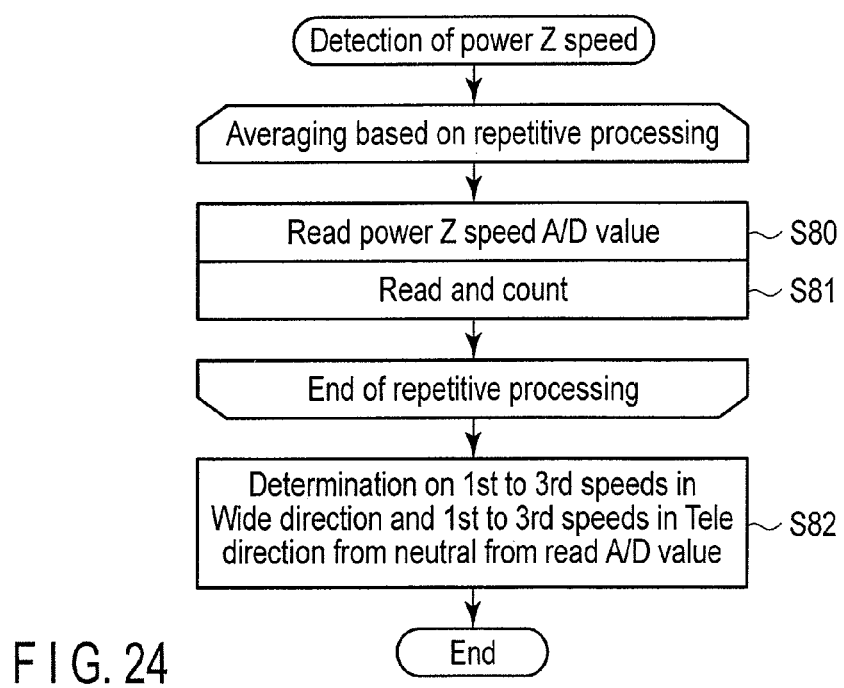
FIG. 24 is a power Z speed detecting flowchart in the optical device.

At a step S100, the lens control unit 11 determines a speed of the second zoom group (2G) 7 based on the zoom speed detected by the power Z speed detection processing (FIG. 24). The lens control unit 11 performs initial excitation to the second zoom group (2G) 7 at a step S101, acceleration drive at a step S102, drive at a fixed speed at a step S103, deceleration drive at a step S104, and holding excitation at a step S105.

In addition, at a step S106, the lens control unit 11 determines a profile of the third zoom group (3G) 8 based on a moving speed of the speed of the second zoom group (2G) 7 determined at the step S100. Thereafter, the lens control unit 11 executes control in accordance with the determined profile. The lens control unit 11 performs initial excitation with respect to the third zoom group (3G) 8 at a step S107, acceleration drive at a step S108, drive at a fixed speed at a step S109, deceleration drive at a step S110, and holding excitation at a step S111.

The fixed-speed drive of the third zoom group (3G) (the steps S93 and S109) will now be described with reference to a third zoom group fixed speed drive flowchart shown in FIG. 27.

The third zoom group fixed speed drive is executed in the following flow. That is, although the 3G drive processing is performed at a step S46 in the mechanical manual zoom processing flowchart shown in FIG. 20, the 3G fixed speed drive processing is effected at the step S93 as shown in the 3G drive processing flowchart in FIG. 25.

In the 3G fixed speed drive processing at the step S93, the third zoom group (3G) is driven at a fixed speed as described above. At this time, the third group reference position detection unit (the photo-interrupter (PI)) 19 integrally moves with the third zoom group (3G) 8 in the direction of the optical axis P as shown in FIG. 8 and acquires the reference position of the third zoom group (3G) 8. When the third group reference position detection unit (the photo-interrupter (PI)) 19 moves, the plate-like comb tooth member 194 is arranged in the space between the light-emitting portion 191 and the light-receiving portion 192 in the third group reference position detection unit (the photo-interrupter (PI)) 19. Based on this arrangement, the light-shielding wall bodies 194a and the open spaces 194b of the comb tooth member 194 alternately pass between the light-emitting portion 191 and the light-receiving portion 192. As a result, the third group reference position detection unit 19 alternately outputs the light reception signal (an H-level signal: associated with a position of each open space 194b indicating that the light-receiving portion 192 has received light from the light-emitting portion 191 and the light non-reception signal (an L-level signal: associated with a position of each light-shielding wall body 194a) indicating that the light has not been received.

The lens control unit 11 alternately receives the H-level signal and the L-level signal output from the third group reference position detection unit (the photo-interrupter (PI)) 19.

Figure 27:
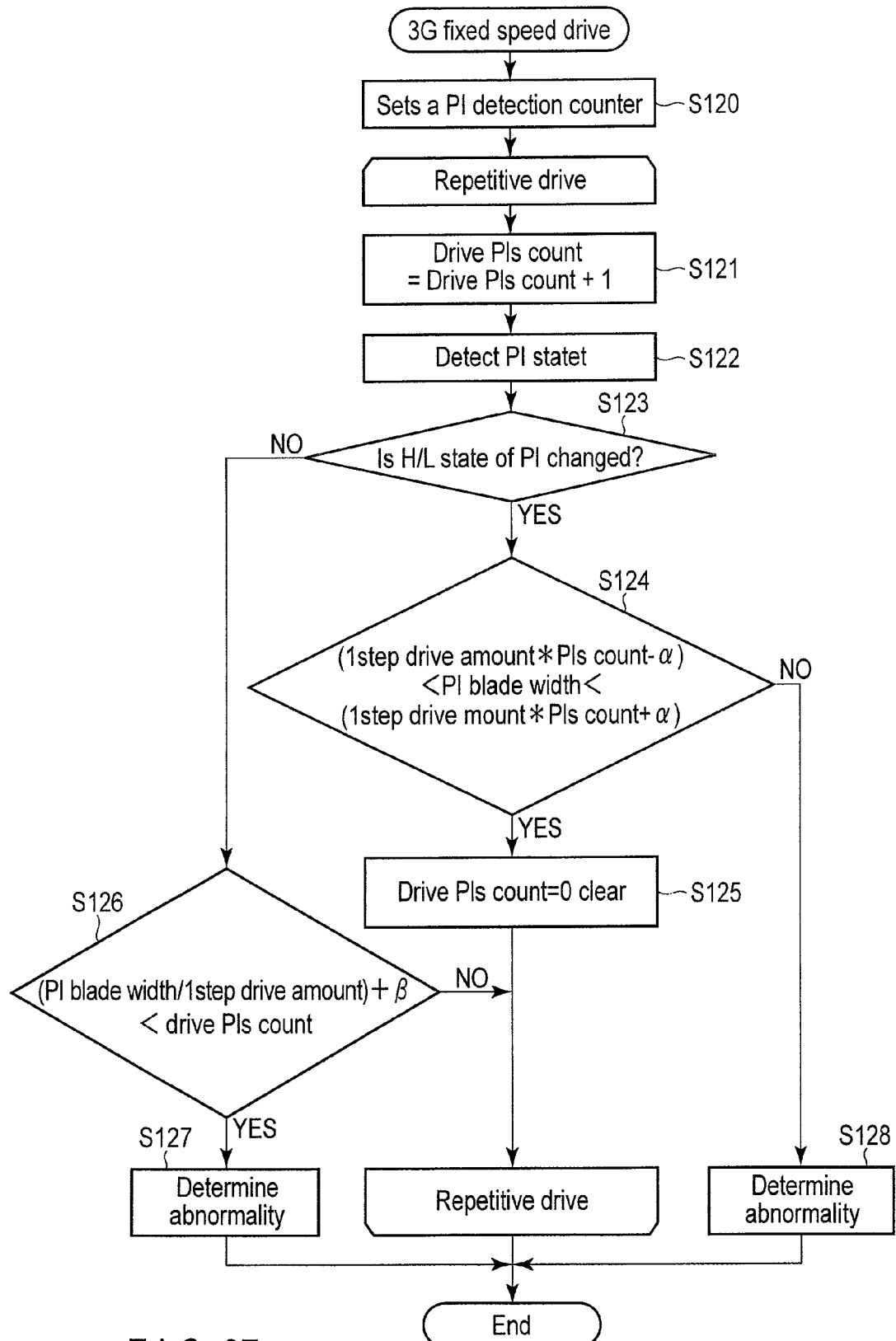
FIG. 27 is a third zoom group fixed speed drive flowchart in the optical device.

At a step S120 of the 3G fixed speed drive flowchart shown in FIG. 27, the lens control unit 11 sets a PI detection counter that counts the light reception signal (the H-level signal: associated with a position of each open space 194b) and the light non-reception signal (the L-level signal: associated with a position of each light-shielding wall body 194a) output from the third group reference position detection unit (the photo-interrupter (PI)) 19.

At a step S121, the lens control unit 11 sequentially outputs drive pulse signals to the third group drive mechanism 17, which moves the third zoom group (3G) 8, in accordance with each pulse. In addition, the lens control unit 11 counts the drive pulse signals in accordance with each pulse and obtains the counted drive pulse number. That is, the lens control unit 11 sets the drive pulse counter and counts the drive pulse number +1 by using this drive pulse counter. The drive pulse number counted by the drive pulse counter in this manner is control position information of the third zoom group (3G) 8.

At a step S122, the lens control unit 11 sequentially detects a state of each output signal from the third group reference position detection unit (the photo-interrupter (PI)) 19, i.e., the H-level signal and the L-level signal.

At a step S123, the lens control unit 11 determines whether each output signal from the third group reference position detection unit (the photo-interrupter (PI)) 19 has changed between the H-level signal and the L-level signal. When the third group reference position detection unit (the photo-interrupter (PI)) 19 moves in the direction of the optical axis P integrally with the third zoom group (3G) 8, the light-shielding wall bodies 194a and the open spaces 194b of the comb tooth member 194 alternately pass through the space between the light-emitting portion 191 and the light-receiving portion 192 in the third group reference position detection unit (the photo-interrupter (PI)) 19. As a result, each output signal from the third group reference position detection unit (the photo-interrupter (PI)) 19 alternately changes between the H-level signal and the L-level signal. The lens control unit 11 monitors each output signal from the third group reference position detection unit (the photo-interrupter (PI)) 19 and determines a change between the H-level signal and the L-level signal.

At a step S124, the lens control unit 11 determines whether the control state of the third zoom group (3G) 8 is abnormal, i.e., whether step-out has occurred based on control position information used for controlling movement of the third zoom group (3G) 8 and positional information of the third zoom group (3G) 8 detected by the third group reference position detection unit 19.

Specifically, the lens control unit 11 monitors the H-level signal and the L-level signal output from the third group reference position detection unit (the photo-interrupter (PI)) 19.

The third group drive mechanism 17 is the 3G zoom actuator 18 such as a stepping motor. The lens control unit 11 stores a moving length of the 3G zoom actuator 18 per step. The lens control unit 11 multiples the stored moving length per step by the drive pulse number counted by the drive pulse counter to obtain a moving length of the third zoom group (3G) 8.

The lens control unit 11 previously stores in the memory each first width Ha(PI blade width) of each light-shielding wall body 194a of the comb tooth member 194 in the third group reference position detection unit (the photo-interrupter (PI)) 19. The lens control unit 11 stores in the memory that each first width Ha corresponds to 4 pulses+α when converted into, e.g., a drive pulse number. As the first width Ha of each light-shielding wall body 194a, design data or a measured value is stored.

The lens control unit 11 compares a moving length (a moving distance) of the third zoom group (3G) 8 obtained by the multiplication of the drive pulse number and the moving length per step in a period from a time point that the output signal from the third group reference position detection unit (the photo-interrupter (PI)) 19 is changed from the H-level signal to the L-level signal to a time point that this signal is again changed from the L-level signal to the H-level signal, i.e., a period that the light-emitting portion 191 and the light-receiving portion 192 pass the first width Ha of the light-shielding wall body 194a with the first width Ha which is stored data.

Giving a specific description, the lens control unit 11 determines whether the first width Ha as the design data is included in the range of each value obtained by adding or subtracting a correction coefficient α with respect to a multiplied value of the moving length per step and the drive pulse number as represented by Expression (1).

$$\text{The multiplied value of the moving length per step and the drive pulse number} - \alpha < \text{the first width Ha as the design data} < \text{the multiplied value of the moving length per step and the drive pulse number} + \alpha \quad (1)$$

If the first width Ha as the design data is included in the range of each value obtained by adding or subtracting the correction coefficient α with respect to a multiplied value of the moving length per step and the drive pulse number as a result of this determination, a position of the third zoom group (3G) 8 is determined to be normal, and the lens control unit 11 clears a count value in the drive pulse counter to "0" at a step S125.

Thereafter, the lens control unit 11 repeats the steps S121 to S125.

On the other hand, if it is determined that each output signal from the third group reference position detection unit (the photo-interrupter (PI)) 19 is not changed between the H-level signal and the L-level signal as a result of the determination at the step S123, the lens control unit 11 advances to a step S126, divides the first width Ha(PI blade width) as the design data by the moving length per step, and determines whether a value obtained by adding a correction coefficient β to this quotient is smaller than the drive pulse number counted by the drive pulse counter. That is, the lens control unit 11 determines Expression (2):

(The first width Ha as the design data/the moving length per step)+β<the drive pulse number  (2)

β is the correction coefficient taking a shift length produced due to a response speed or the like of the third group reference position detection unit (the photo-interrupter (PI)) 19 into consideration, and it is, e.g., 4 pulses or 8 pulses which is the pulse number per rotation of a stepping motor.

If the value obtained by adding the correction coefficient β to the quotient obtained by dividing the first width Ha as stored data by the moving length per step is smaller than the drive pulse number as a result of this determination, the lens control unit 11 determines that the control state of the third zoom group (3G) 8 is abnormal, i.e., step-out has occurred at a step S127.

If the first width Ha as the design data is not included in the range of each value obtained by adding or subtracting the correction coefficient α with respect to the multiplied value of the shift length per step and the drive pulse number as a result of the determination at the step S124, the lens control unit 11 determines that the control state of the third zoom group (3G) 8 is abnormal, i.e., step-out has occurred at the step S128.

This is the end of the description on the 3G fixed speed drive flowchart shown in FIG. 27.

Figure 28:
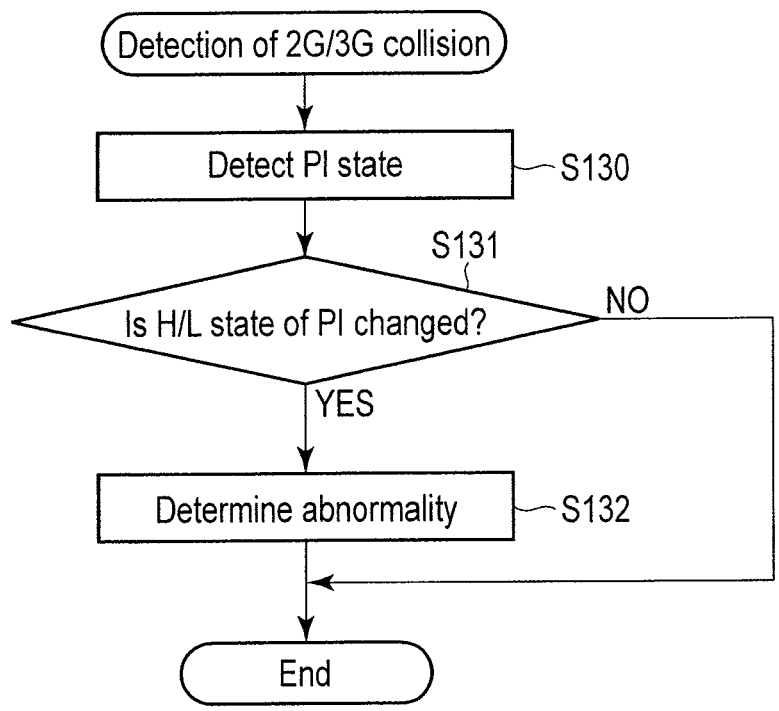
FIG. 28 is a 2G/3G collision detection abnormality determination flowchart for determining abnormality caused due to collision of the second zoom group and the third zoom group in the optical device.

FIG. 28 shows a 2G/3G collision detection flowchart used for determining abnormality of the control state caused due to collision of the second zoom group (2G) 7 and the third zoom group (3G) 8. The 2G/3G collision detection processing is executed at the step S74 in the 2G position detection flowchart depicted in FIG. 23. The 2G position detection processing is executed at the step S40 in the mechanical manual zoom processing flowchart shown in FIG. 20.

In the 2G position detection processing (FIG. 20: the step S40), the lens control unit 11 detects movement of the second zoom group (2G) caused by an operation of the zoom function switching operation member 4 by a user in the mechanical manual mode. In the 2G/3G collision detection (FIG. 23: the step S74), the lens control unit 11 determines whether the second zoom group (2G) has collided with the resting third zoom group (3G) 8 at, e.g., a position K shown in FIG. 11 and the control state is abnormal, i.e., whether step-out has occurred.

At a step S130, the lens control unit 11 detects a state of each output signal from the third group reference position detection unit (the photo-interrupter (PI)) 19, i.e., a state of the H-level signal or the L-level signal.

At a step S131, the lens control unit 11 determines whether the output signal from the third group reference position detection unit (the photo-interrupter (PI)) 19 has been changed between the H-level signal and the L-level signal.

If a change in the output signal from the third group reference position detection unit (the photo-interrupter (PI)) 19 between the H-level signal and the L-level signal is detected as a result of this determination, the lens control unit 11 determines that the control state of the third zoom group (3G) 8 is abnormal, i.e., step-out has occurred at a step S132. On the other hand, if the output signal from the third group reference position detection unit (the photo-interrupter (PI)) 19 remains unchanged, the lens control unit 11 determines that the control state is normal and terminates the processing.

As described above, it is possible to detect that the second zoom group (2G) collides with the third zoom group (3G) and step-out of the third zoom group (3G) occurs when the second zoom group (2G) is moved by an operation of the zoom function switching operation member 4 in the mechanical manual zoom operation.

A restoration processing flowchart shown in FIG. 29 will now be described.

When it is determined that the control state is abnormal, i.e., step-out has occurred at the respective steps S127 and S128 in the third zoom group fixed speed drive flowchart shown in FIG. 27 or at the step S132 shown in FIG. 28, the lens control unit 11 carries out the restoration processing flowchart depicted in FIG. 29.

At a step S140, the lens control unit 11 sets a restoration processing parameter. The restoration processing parameter is an applied voltage value of the 3G zoom actuator 18, or a driving speed. The restoration processing parameter is set so that, for example, a voltage setting to the 3G zoom actuator 18 such as the stepping motor of the third group drive mechanism 17 is raised to set the motor to a high torque, or the driving speed is lowered to drive the 3G zoom actuator 18 such as the stepping motor at the high torque. During a usual driving operation which is not a restoration processing operation, the above voltage setting is further lowered to achieve muffling.

The lens control unit 11 drives the 3G zoom actuator 18 such as the stepping motor of the third group drive mechanism 17 by the restoration processing parameter, and moves the third zoom group (3G) 8 toward an initializing position (the reset position), e.g., the wide-angle (Wide) end or telescopic (Tele) end of the optical zoom. FIG. 30 shows a schematic view of movement f1 of the third zoom group (3G) 8 toward the telescopic (Tele) end after determining the step-out which is the abnormality of the control state.

The moving direction of the third zoom group (3G) 8 is a direction toward the wide-angle (Wide) end at which the second zoom group (2G) 7 does not collide with the third zoom group (3G) 8, or a direction toward the telescopic (Tele) end. The moving direction of the third zoom group (3G) 8 can be determined by grasping the current position of each of the second zoom group (2G) 7 and the third zoom group (3G) 8 by the lens control unit 11.

At a step S141, the lens control unit 11 determines whether each output signal from the third group reference position detection unit (the photo-interrupter (PI)) 19 has changed between the H-level and the L-level. When the signal is not changed as a result of this determination, the lens control unit 11 repeats the determination until the output signal from the third group reference position detection unit (the photo-interrupter (PI)) 19 changes between the H-level and the L-level.

Here, the output of the third group reference position detection unit (the photo-interrupter (PI)) 19 indicates that the L-level corresponds to each light-shielding wall body of the comb tooth member 194.

When the output signal of the third group reference position detection unit (the photo-interrupter (PI)) 19 changes from the L-level to the H-level, the lens control unit 11 determines at a step S142 whether the detected width of the L-level (corresponding to movement f2) coincides with a period of time corresponding to the third width Hc of the Tele-end comb tooth 195T on the Tele-end side. That is, the lens control unit 11 determines whether the third zoom group (3G) 8 has reached a position corresponding to the right end (FIG. 30) of the Tele-end comb tooth 195T. Since the width of the Tele-end comb tooth 195T is formed to be shorter than the width of the light-shielding wall body 194a, for example, as much as ½, the lens control unit 11 can detect the position from the width of the L-level signal output from the third group reference position detection unit (the photo-interrupter (PI)) 19.

Furthermore, at a step S143, the lens control unit 11 outputs excessive pulses (γ-pulses) to the 3G zoom actuator 18 such as the stepping motor of the third group drive mechanism 17 so that the third zoom group passes over the position of the Tele-end comb tooth 195T to cancel a backlash. In consequence, the third zoom group (3G) 8 passes over the Tele-end comb tooth 195T as much as the excessive pulses (the γ-pulses) (movement f3). The number of the excessive pulses (the γ-pulses) varies, for example, owing to the backlash or the like of the third group drive mechanism 17 or the like.

Afterward, the lens control unit 11 moves the third zoom group (3G) 8 to the reset position corresponding to the Tele-end comb tooth 195T (movement f4).

At a step S144, the lens control unit 11 determines whether the output signal of the third group reference position detection unit (the photo-interrupter (PI)) 19 has changed from the H-level signal to the L-level signal. When the signal changes from the H-level signal to the L-level signal, the lens control unit 11 ends the restoration processing. At this time, the third zoom group (3G) 8 reaches a position corresponding to the right end (FIG. 30) of the Tele-end comb tooth 195T, and ends the restoration processing.

Thus, according to the above embodiment, it is determined whether the control state of the third zoom group (3G) 8 is abnormal, i.e., whether the step-out has occurred based on the control positional information for controlling the movement of the third zoom group (3G) 8 and the positional information of the third zoom group (3G) 8 detected by the third group reference position detection unit 19. Specifically, the lens control unit predicts the predictive positional information of the third zoom group (3G) 8 based on the control positional information for controlling the movement of the third zoom group (3G) 8, compares the predictive positional information with the positional information of the third zoom group (3G) 8 detected by the third group reference position detection unit 19, and determines whether the control state of the third zoom group (3G) 8 is abnormal and whether the step-out has occurred. In consequence, according to the present interchangeable lens, low cost and miniaturization can be achieved. Moreover, when the stepping motor steps out in the zoom operation, the step-out can be detected to immediately perform a restoring operation, and the lens can have a zoom function with excellent operability.

When it is determined that the control state of the third zoom group (3G) 8 is abnormal and the step-out occurs, there is performed the restoration processing of selecting one initializing position from the initializing positions, moving the third zoom group (3G) 8 to the selected one initializing position, and initializing (resetting) the positional information of the third zoom group (3G) 8 detected by the third group reference position detection unit 19, so that the control state of the third zoom group (3G) 8 can be restored to be normal again.

The initialization (the resetting) can be performed at the initializing (reset) position which is the position closest to the position of the third zoom group (3G) 8 where the step-out has occurred, i.e., at the wide-angle (Wide) end or telescopic (Tele) end of the optical zoom, or the intermediate position between the wide-angle (Wide) end and the telescopic (Tele) end, so that time required for the restoration processing can be shortened.

In the restoration processing, the third zoom group (3G) 8 can be moved to the initializing position which is present in a direction where the second zoom group (2G) 7 and the third zoom group (3G) 8 do not mechanically interfere with each other among the initializing positions.

It is to be noted that the comb tooth member 194 of the present embodiment may be modified as follows.

FIG. 31 shows a structural view showing a modification of the comb tooth member 194. In the comb tooth member 194, two resetting comb teeth 194c are formed at an intermediate position between a Wide-end comb tooth 195W and a Tele-end comb tooth 195T. Each of the comb teeth 194c is formed with a third width Hc in the same manner as in the Wide-end comb tooth 195W and the Tele-end comb tooth 195T. The lens control unit 11 can initialize (reset) the position of the third zoom group (3G) 8 at each of the Wide-end comb tooth 195W and the Tele-end comb tooth 195T, and can initialize (reset) the position of the third zoom group (3G) 8 also at the intermediate position between the Wide-end comb tooth 195W and the Tele-end comb tooth 195T in the comb tooth member 194.

For example, when the third zoom group (3G) 8 is moved to the telescopic (Tele) end side as shown in FIG. 11 described above, the second zoom group (2G) 7 does not collide with the third zoom group (3G) 8. In consequence, after determining the step-out, the third zoom group (3G) 8 is moved to the telescopic (Tele) end side. Thus, it is possible to detect the width Hc of each of the two comb teeth 194c at the intermediate position between the Wide-end comb tooth 195W and the Tele-end comb tooth 195T, specify the initializing position, and initialize (reset) the position of the third zoom group (3G) 8. According to such a constitution, the initializing can be performed in a shorter time.

FIG. 32 shows a structural view showing another modification of the comb tooth member 194. In the comb tooth member 194, three resetting comb teeth 194d, 194e and 194f are formed at an intermediate position between a Wide-end comb tooth 195W and a Tele-end comb tooth 195T. The comb teeth 194d, 194e and 194f are formed with different widths, respectively. The comb tooth 194d is formed with a third width Hc. The comb tooth 194e is formed with a first width Ha which is twice the third width Hc. The comb tooth 194f is formed with a fourth width Hd which is three times the third width Hc. Also when the comb teeth 194d, 194e and 194f are formed, in the same manner as in the detection processing of the comb tooth member 194 shown in FIG. 32 described above, the widths Hc, Ha and Hd of the three comb teeth 194d, 194e and 194f can be detected to specify the initializing position, and the position of the third zoom group (3G) 8 can be initialized (reset) at the intermediate position between the Wide-end comb tooth 195W and the Tele-end comb tooth 195T. According to such a constitution, the initializing can be performed in a shorter time.

FIG. 33 shows a structural view showing still another modification of the comb tooth member 194. In the comb tooth member 194, for example, at a telescopic (Tele) end, for example, spaces among three Tele-end comb teeth 195T are changed. The space between the most Tele-end side comb tooth and the second Tele-end comb tooth 195T is set to be the same space as a third width Hc. The space between the second Tele-end comb tooth and the third Tele-end comb tooth 195T is set to be the same space as a second width Hb. The next space between the Tele-end comb teeth 195T is set to be the same space as the second width Hb. Also on a wide-angle (Wide) end side, a space between Wide-end comb teeth 195W may be formed to be the same space as that between the Tele-end comb teeth 195T on the Tele-end side. The spaces among the three Tele-end comb teeth 195T having different spaces can be detected to specify the initializing position, and the position of the third zoom group (3G) 8 can be initialized (reset) at the Wide-end comb teeth 195W and the Tele-end comb teeth 195T. According to such a constitution, the initializing can more securely be performed.

FIG. 34 shows a structural view showing a further modification of the comb tooth member 194. In the comb tooth member 194, widths of light-shielding wall bodies 194a are successively formed to be longer from a wide-angle (Wide) end side and from a telescopic (Tele) side, respectively. For example, the widths of the light-shielding wall bodies 194a are formed to be longer as in Hc, 2Hc, 3Hc, 4Hc, . . . from the wide-angle (Wide) end side, and similarly, the widths of the light-shielding wall bodies 194a are formed to be longer as in Hc, 2Hc, 3Hc, 4Hc, . . . from the telescopic (Tele) end side.

According to the comb tooth member 194, the width of the light-shielding wall body 194a corresponds to the position of the third zoom group (3G) 8, and hence when the width of the light-shielding wall body 194a is detected, the position of the third zoom group (3G) 8 can be specified. Moreover, for example, when the width 2Hc of the light-shielding wall body 194a is detected and next the width 5Hc is detected, it can be determined that the third zoom group (3G) 8 steps out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:
at least first and second lens groups which move in a direction of an optical axis to perform an optical zoom operation;
an operation member which instructs the optical zoom operation;
a first lens group position detection unit which detects a position of the first lens group that moves in accordance with an operation of the operation member;
a second lens group position detection unit which outputs a signal corresponding to a position of the second lens group;
a storage unit which stores positional relationship information indicating a positional relationship between the first lens group and the second lens group associated with a focal length at the zoom operation; and
a control unit which controls the movement of the second lens group based on positional information of the first lens group detected by the first lens group position detection unit and the positional relationship information stored in the storage unit;
wherein the second lens group position detection unit includes:
a detection element which moves in the direction of the optical axis integrally with the second lens group and includes a light-emitting portion and a light-receiving portion; and
a comb tooth member which includes light-shielding regions where a light-shielding state is brought between the light-emitting portion and the light-receiving portion and transmitting regions where a transmitting state is brought between the light-emitting portion and the light-receiving portion, and which is formed by alternately aligning the light-shielding regions and the transmitting regions in the direction of the optical axis;
wherein in the light-shielding regions are formed with a first width, the transmitting regions are formed with a second width, and the light-shielding region or the transmitting region corresponding to the initializing position of the second lens group is formed with a third width which is different from the first and second widths;
while light is emitted from the light-emitting portion, the control unit determines whether the control state of the second lens group is abnormal based on a signal corresponding to the position o the second lens group which is output from the light-receiving portion of the second lens group position detection unit when the second lens group moves, and the control positional information during the control of the movement of the second lens group, when the control unit determines that the control state of the second lens group is abnormal, the control unit moves the second lens group to the initializing position to perform an initializing operation.

2. The optical device according to claim 1,
wherein the storage unit stores initializing positions to initialize the position of the second lens group and the control positional information of the second lens group, and
when the control unit determines that the control state of the second lens group is abnormal, the control unit selects one initializing position from the initializing positions stored in the storage unit based on the positional information of the first lens group detected by the first lens group position detection unit and the control positional information of the second lens group detected by the second lens group position detection unit, moves the second lens group to the one selected initializing position, and initializes the control positional information of the second lens group.

3. The optical device according to claim 2,
wherein the control unit moves the second lens group to the initializing position which is present in a movement direction along which the first lens group and the second lens group do not mechanically interfere with each other in the initializing positions, and initializes the control positional information of the second lens group.

4. The optical device according to claim 2,
wherein the control unit moves the second lens group to the initializing position which is present most closely to the positional information of the second lens group detected by the second lens group position detection unit in the initializing positions, and initializes the control positional information of the second lens group.

5. The optical device according to claim 2,
wherein the initializing positions include at least a wide-angle end position corresponding to a wide-angle end of the optical zoom operation.

6. The optical device according to claim 2,
wherein the initializing positions include at least a telescopic end position corresponding to a telescopic end of the optical zoom operation.

7. The optical device according to claim 2,
wherein the initializing positions include at least an intermediate position between a wide-angle end position corresponding to a wide-angle end of the optical zoom operation and a telescopic end position corresponding to a telescopic end.

8. The optical device according to claim 1,
wherein in the comb tooth member, the light shielding region is formed with a first width, and
when the control unit moves the second lens group, the control unit acquires a moving amount of the second lens group as the control positional in formation based on a period of time when the signal is output from the light-receiving portion in the light-shielding region, and compares the moving amount with a moving amount corresponding to the first width to determine whether the control state is abnormal.

9. The optical device according to claim 1,
wherein in the comb tooth member, the transmitting region is formed with a second width, and
when the control unit moves the second lens group, the control unit acquires a moving amount of the second lens group as the control positional information based on a period of time when the signal is output from the light-receiving portion in the transmitting region, and compares the moving amount with a moving amount corresponding to the second width to determine whether the control state is abnormal.

10. The optical device according to claim 1,
wherein in the comb tooth member, the light-shielding region is formed with a first width, and
while the light-receiving portion outputs the signal corresponding to the first width, the control unit repetitively acquires a moving amount of the second lens group, and repetitively compares the acquired moving amount with a previously stored moving amount corresponding to the first width to determine whether the control state is abnormal.

11. The optical device according to claim 1,
wherein in the comb tooth member, the transmitting region is formed with a second width, and
while the light-receiving portion outputs the signal corresponding to the second width, the control unit repetitively acquires a moving amount of the second lens group, and repetitively compares the acquired moving amount with a previously stored moving amount corresponding to the second width to determine whether the control state is abnormal.

12. The optical device according to claim 1,
wherein the control unit initializes the control positional in formation of the second lens group while the second lens group is moved to the initializing position.

13. The optical device according to claim 1,
wherein the initializing position of the second lens group is disposed at a wide-angle end position corresponding to a wide-angle end of the optical zoom operation in the comb tooth member.

14. The optical device according to claim 1,
wherein the initializing position of the second lens group is disposed at a telescopic end position corresponding to a telescopic end of the optical zoom operation in the comb tooth member.

15. The optical device according to claim 1,
wherein the initializing position of the second lens group is disposed at an intermediate position between a wide-angle end position corresponding to a wide-angle end of the optical zoom operation and a telescopic end position corresponding to a telescopic end in the comb tooth member.

16. The optical device according to claim 1,
wherein the control unit detects the movement of the first lens group based on the signal output from the first lens group position detection unit, and determines whether the control state of the second lens group is abnormal based on the signal output from the second lens group position detection unit, while the second lens group is not moved.

17. The optical device according to claim 16,
wherein the control unit performs an initializing operation of the second lens group, when the control unit determines that the control state of the second lens group is abnormal.

* * * * *